(12) United States Patent
Arai et al.

(10) Patent No.: US 7,948,505 B2
(45) Date of Patent: May 24, 2011

(54) METHOD FOR REDUCING TEMPORAL ARTIFACTS IN DIGITAL VIDEO SYSTEMS

(75) Inventors: Kazuma Arai, Kitanodai hachiouji (JP); Fusao Ishii, Menlo Park, CA (US); Yoshihiro Maeda, Hachioji (JP); Hirotoshi Ichikawa, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 939 days.

(21) Appl. No.: 11/893,660

(22) Filed: Aug. 16, 2007

(65) Prior Publication Data

US 2008/0074561 A1    Mar. 27, 2008

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/840,878, filed on Aug. 29, 2006.

(51) Int. Cl.
*G09G 3/34* (2006.01)
*G09G 5/10* (2006.01)
*G09G 5/02* (2006.01)

(52) U.S. Cl. ........... 345/691; 345/692; 345/693; 345/84

(58) Field of Classification Search .......... 345/211–214, 345/84, 690–693, 89, 90, 98–100; 359/290, 359/291, 295, 223, 224; 348/744
See application file for complete search history.

(56) References Cited

U.S. PATENT DOCUMENTS

| | | |
|---|---|---|
| 4,229,732 A | 10/1980 | Hartstein et al. |
| 4,769,713 A | 9/1988 | Yasui |
| 5,192,946 A | 3/1993 | Thompson et al. |
| 5,214,420 A | 5/1993 | Thompson et al. |
| 5,285,407 A | 2/1994 | Gale et al. |
| 5,287,096 A | 2/1994 | Thompson et al. |
| 5,303,055 A | 4/1994 | Hendrix |
| 5,448,314 A | 9/1995 | Helmbuch et al. |
| 5,452,024 A | 9/1995 | Sampsell |
| 5,489,952 A | 2/1996 | Gove et al. |
| 5,589,852 A | 12/1996 | Thompson et al. |
| 5,617,243 A | 4/1997 | Yamazaki et al. |
| 5,619,228 A * | 4/1997 | Doherty ........................ 345/693 |
| 5,668,611 A | 9/1997 | Ernstoff et al. |
| 5,686,939 A | 11/1997 | Millward et al. |
| 5,767,828 A | 6/1998 | McKnight |
| 5,969,710 A | 10/1999 | Doherty et al. |

(Continued)

*Primary Examiner* — Kevin M Nguyen
(74) *Attorney, Agent, or Firm* — Bo-In Lin

(57) ABSTRACT

The present invention provides an image signal processor, comprising: (a) an input circuit for receiving and/or holding an image signal of N-bit binary data word, where N is a positive integer; (b) a data converter converting at least M-bit data of binary data into non-binary data having multiple bits, where M is a positive integer and $N \geq M \geq 2$, wherein (c) all bits of the non-binary data have a weight which is equal to, or less than, that of the least significant bit of the M-bit data of binary data; and (d) the data converter outputting the each bit of the non-binary data in sequence starting from an equal data value.

25 Claims, 25 Drawing Sheets

U.S. PATENT DOCUMENTS

| | | |
|---|---|---|
| 5,986,640 A | 11/1999 | Baldwin et al. |
| 6,008,929 A | 12/1999 | Akimoto et al. |
| 6,034,660 A | 3/2000 | Millward et al. |
| 6,064,366 A | 5/2000 | Millward et al. |
| 6,184,852 B1 | 2/2001 | Millward et al. |
| 6,310,591 B1 * | 10/2001 | Morgan et al. .................. 345/84 |
| 6,567,134 B1 * | 5/2003 | Morgan ......................... 348/743 |
| 6,999,224 B2 | 2/2006 | Huibers |
| 7,154,458 B2 | 12/2006 | Nakanishi |
| 7,161,608 B2 * | 1/2007 | Pettitt et al. .................... 345/690 |
| 7,438,043 B2 * | 10/2008 | Shiraishi et al. ............... 123/260 |
| 7,515,161 B1 * | 4/2009 | Morgan ......................... 345/691 |
| 2005/0105008 A1 | 5/2005 | Doyen et al. |
| 2005/0168454 A1 | 8/2005 | Bellis, II et al. |

* cited by examiner

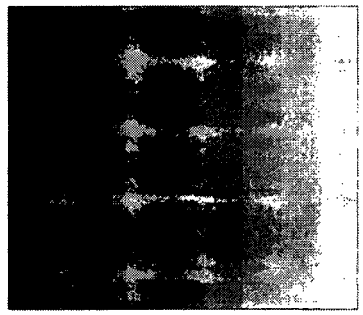
Lower gray scale
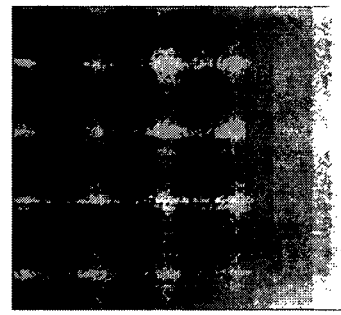
Higher gray scale
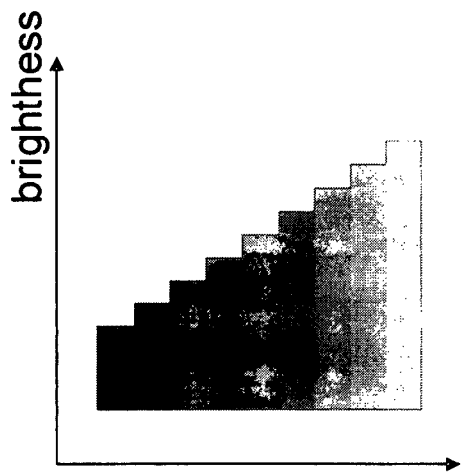
Less levels of brightness
FIG. 2A
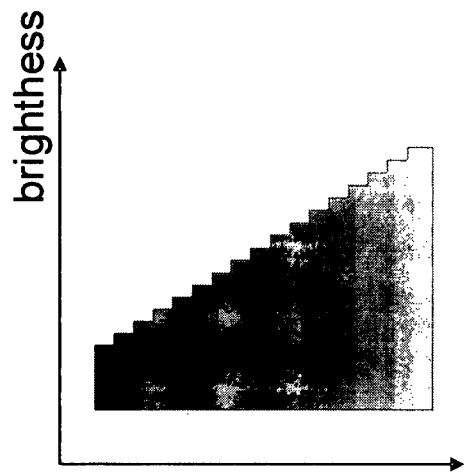
More levels of brightness
FIG. 2B

1:2: 4: 8 : 16 : 32 : 64  128

Output=255

1:2: 4: 8 : 16 : 32 : 64  128

Output=128

1:2: 4: 8 : 16 : 32 : 64  128

Output=128

The mirror element of deflection mirror device

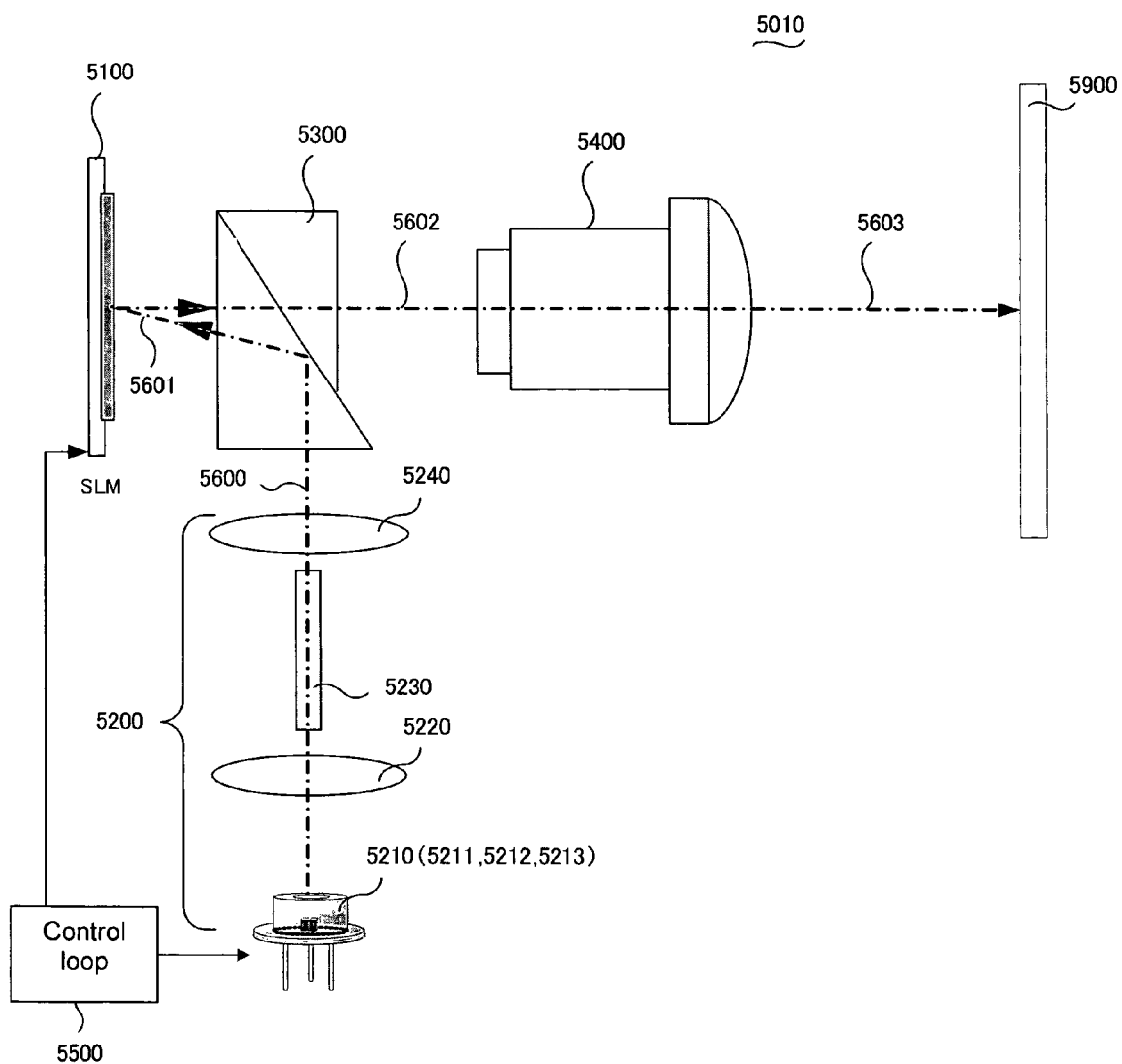
FIG. 19 Projection display system of single SLM panel with varying light source

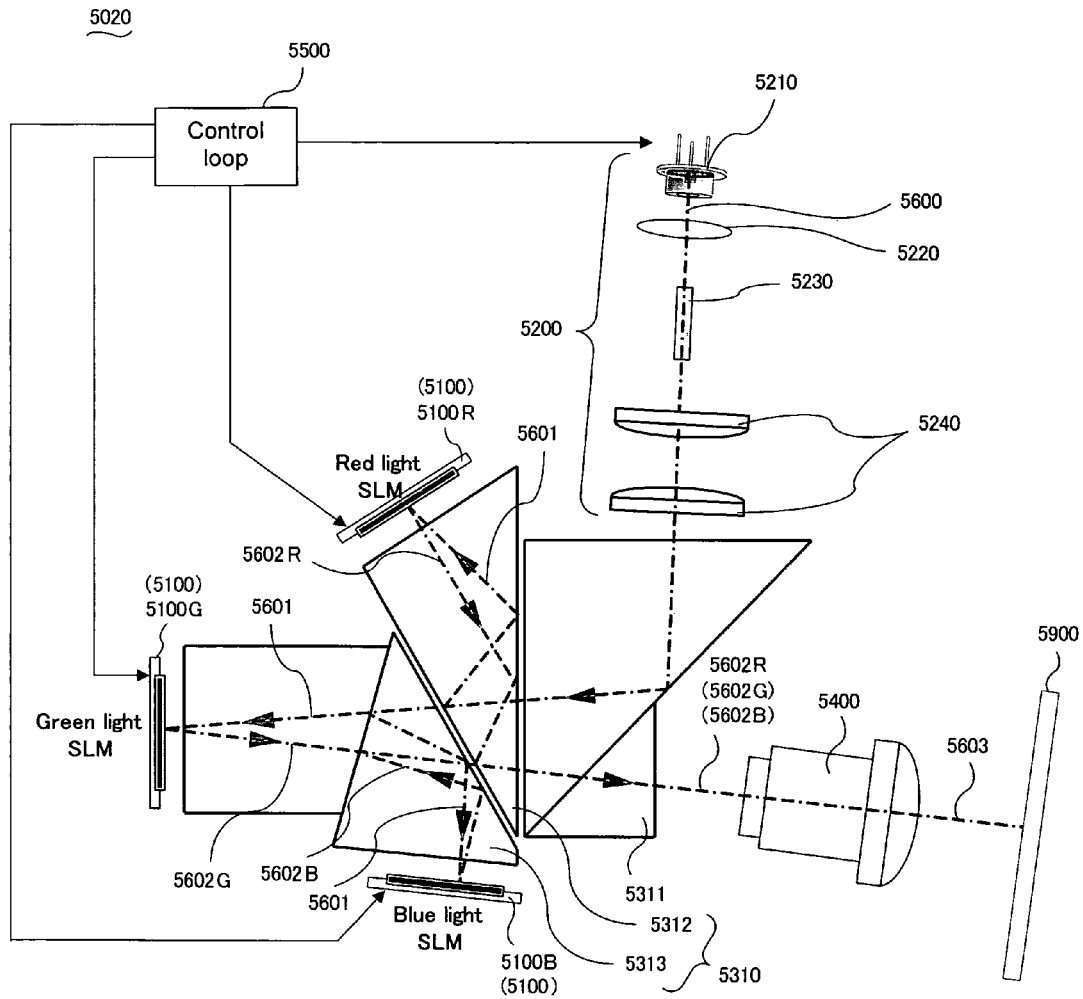
FIG. 20 Projection display system of 3 SLM panels with varying light source

METHOD FOR REDUCING TEMPORAL ARTIFACTS IN DIGITAL VIDEO SYSTEMS

This application is a Non-provisional Application of a Provisional Application 60/840,878 filed on Aug. 29, 2006. The Provisional Application 60/840,878 is a Continuation in Part (CIP) Application of a U.S. patent application Ser. No. 11/121,543 filed on May 4, 2005 now U.S. Pat. No. 7,268,932. The application Ser. No. 11/121,543 is a Continuation in part (CIP) Application of three previously filed Applications. These three applications are Ser. No. 10/698,620 filed on Nov. 1, 2003 now abandoned, Ser. No. 10/699,140 filed on Nov. 1, 2003 now U.S. Pat. No. 6,862,127, and Ser. No. 10/699,143 filed on Nov. 1, 2003 now U.S. Pat. No. 6,903,860 by one of the Applicants of this patent application. The disclosures made in these patent applications are hereby incorporated by reference in this patent application.

BACKGROUND OF THE INVENTION

1. Field of the Invention

The present invention relates to a projection display system, and more particularly, this invention relates to a display system that improves temporal artifacts of a projection display by using spatial light modulators controlled by converting binary control signals to non-binary control signals to rearranging distributions of operational states of the mirrors.

2. Description of the Related Art

After the dominance of CRT technology in the display industry for over the past 100 years, Flat Panel Display (FPD) and Projection Display technologies are now gaining popularity because of a small form-factor of the display control system while enabled to project and display images of greater size onto a bigger display screen. Among several types of projection displays, projection displays using micro-display are gaining recognition by consumers because of high performance of picture quality as well as lower cost than FPDs. There are two types of micro-displays used for projection displays in the market. One is micro-LCD (Liquid Crystal Display) and the other is micromirror technology. Because a micromirror device uses un-polarized light, a micromirror device has an advantage on brightness over micro-LCD, which uses polarized light.

Even though there are significant advances made in recent years on the technologies of implementing electromechanical micromirror devices as spatial light modulator, there are still limitations and difficulties when employing them to provide high quality images display. Specifically, when the display image is digitally controlled, the image quality is adversely affected due to the fact that the image is not displayed with a sufficient number of gray scales.

An electromechanical mirror device is drawing a considerable interest as a spatial light modulator (SLM). The electromechanical mirror device consists of "a mirror array" arraying a large number of mirror elements. In general, the mirror elements ranging from 60,000 to several millions are arranged on a surface of a substrate in an electromechanical mirror device. Referring to FIG. 1A, an image display system 1 including a screen 2 is disclosed in a reference U.S. Pat. No. 5,214,420. A light source 10 is used for generating light energy for illuminating the screen 2. The generated light 9 is further concentrated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto the screen 2. The SLM 15 has a mirror array arraying switchable reflective elements 17, 27, 37, and 47 consisting of a mirror 33 connected by a hinge 30 on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is not redirected toward the screen 2 and hence the pixel 3 is dark.

Each of mirror elements constituting a mirror device for functioning as a spatial light modulator (SLM) and each mirror element comprises a mirror and electrodes. A voltage applied to the electrode(s) generates a coulomb force between the mirror and electrode, thereby making it possible to control and incline the mirror. And the mirror is "deflected" according to a common term used in this specification for describing the operational condition of a mirror element.

When a voltage applied to the electrodes for controlling the mirror deflects a mirror, the deflected mirror also changes the direction of a reflected light as a result of reflecting an incident light. The direction of the reflected light is changed in accordance with the deflection angle of the mirror. The present specification refers to a state of the mirror when a light of which almost the entirety of an incident light is reflected to a projection path designated for an image display as an "ON light", while it refers to a light reflected to a direction other than the designated projection path for the image display as an "OFF light".

And a state of the mirror that reflects the light of an incident light in a manner that the ratio of the light reflected to a projection path (i.e., the ON light) to that reflected in a shift from the projection path (i.e., the OFF light) is a specific ratio, that is, the light reflected to the projection path with a smaller quantity of light than the state of the ON light is referred to as an "intermediate light".

According to a term of present specification, an angle of rotation in a clockwise (CW) direction is defined as a positive (+) angle and that of rotation counterclockwise (CCW) direction as negative (−) angle. A deflection angle is defined as zero degree ("0°") when the mirror is in the initial state as a reference of mirror deflection angle.

Most of the conventional image display devices such as the device disclosed in U.S. Pat. No. 5,214,420 implements a dual-state mirror control that controls the mirrors at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in either of the ON or OFF state, the conventional image display apparatus has no way to provide a pulse width for controlling the mirror that is shorter than the control duration allowable in accordance with the LSB. The least quantity of light, which determines on the basis of the gray scale, is the light reflected during the time duration based on the least pulse width. The limited number of gray scales leads to a degradation of the quality of an image.

Specifically, FIG. 1C shows an exemplary control circuit for controlling a mirror element according to the disclosure made in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access Switch Memory (SRAM) design. The transistor M9 connected to a Row-line receives a DATA signal via a Bit-line. The memory cell 32-written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The mirror is driven by a voltage applied to the landing electrode abutting a landing electrode and is held at a predetermined deflection angle on the landing electrode. An elastic "landing chip" is formed at a portion on the landing electrode, which makes the landing electrode contact with mirror, and assists the operation for deflecting the mirror toward the opposite direction when a deflection of the mirror is switched. The landing chip is designed as having the same potential with the landing electrode, so that a shorting is prevented when the landing electrode is in contact with the mirror.

Each mirror formed on a device substrate has a square or rectangular shape and each side has a length of 4 to 15 um. In this configuration, a reflected light that is not controlled for purposefully applied for image display is however inadvertently generated by reflections through the gap between adjacent mirrors. The contrast of image display generated by adjacent mirrors is degraded due to the reflections generated not by the mirrors but by the gaps between the mirrors. As a result, a quality of the image display is degraded. In order to overcome such problems, the mirrors are arranged on a semiconductor wafer substrate with a layout to minimize the gaps between the mirrors. One mirror device is generally designed to include an appropriate number of mirror elements wherein each mirror element is manufactured as a deflectable micromirror on the substrate for displaying a pixel of an image. The appropriate number of elements for displaying image is in compliance with the display resolution standard according to a VESA Standard defined by Video Electronics Standards Association or the number in compliance with the television broadcast standards. In the case in which the mirror device has a plurality of mirror elements corresponding to WXGA (resolution: 1280 by 768) defined by VESA, the pitch between the mirrors of the mirror device is 10 um and the diagonal length of the mirror array is about 0.6 inches.

The control circuit as illustrate in FIG. 1C controls the micromirrors to switch between two states and the control circuit drives the mirror to oscillate to either the ON- or OFF-deflected angle (or position) as shown in FIG. 1A.

The minimum quantity of light controllable to reflect from each mirror element for image display, i.e., the resolution of gray scale of an image for a digitally controlled image display apparatus, is determined by the least length of time that the mirror can be controlled to hold at the ON position. The length of time that each mirror is controlled to hold at the ON position is in turn controlled by multiple bit words. FIG. 1D shows the "binary time periods" in the case of controlling an SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at the ON position during a shortest controllable length of time.

FIG. 2A shows an example of an insufficient number of grayscales, where the minimum step of brightness change is very large and the artifacts are well visible. FIG. 2 shows an example of an improved grayscale in which the artifacts are less visible.

As illustrated in FIG. 2A, when adjacent image pixels are displayed with great degree of different gray scales due to a very coarse scale of controllable gray scale, artifacts are shown between these adjacent image pixels. That leads to image degradations. The image degradations are specially pronounced in bright areas of display when there are "bigger gaps" of gray scales between adjacent image pixels. It was observed in an image of the girl shown in FIG. 3A that there were apparent artifacts on the forehead, the sides of the nose and the upper arm. The artifacts are generated due to a technical limitation that the digitally controlled display does not provide a sufficient number of gray scales. At the bright spots of display, e.g., the forehead, the sides of the nose and the upper arm, the adjacent pixels are displayed with visible gaps of light intensities. When the number of gray scales are increased, the image degradation will be much less even with only twice the number of gray scales as illustrated in FIG. 2B.

Since the micromirrors are controlled to have the fully on and fully off positions, the light intensity is determined by the length of time the micromirror is at the fully on position. In order to increase the number of gray scales of display, the speed of the micromirror must be increased such that the digitally controlled signals can be increased to a higher number of bits.

However, when the speed of the micromirrors is increased, a strong hinge is necessary for the micromirror to sustain a required number of operational cycles for a designated lifetime of operation. In order to drive the micromirrors supported on a further strengthened hinge, a higher voltage is required. The higher voltage may exceed twenty volts and may even be as high as thirty volts. The micromirrors manufactured by applying the CMOS technologies may not probably be suitable for operation at such higher range of voltages and therefore the DMOS or High Voltage MOSFET technologies may be required. In order to achieve higher degree of gray scale control, a more complicate manufacturing process and larger device areas are necessary when DMOS micromirror is implemented.

Conventional modes of micromirror control are therefore facing a technical challenge that the gray scale accuracy has to be sacrificed for the benefits of smaller and more cost effective micromirror display due to the operational voltage limitations.

There are many patents related to a light intensity control. These patents include U.S. Pat. Nos. 5,589,852, 6,232,963, 6,592,227, 6,648,476, and 6,819,064. There are more patents and patent applications related to different shapes of light sources.

These patents includes U.S. Pat. Nos. 5,442,414, 6,036, 318 and Application 20030147052. The U.S. Pat. No. 6,746, 123 discloses special polarized light sources for preventing light loss. However, these patents or patent application does not provide an effective solution to overcome the limitations caused by an insufficient number of gray scales in the digitally controlled image display systems.

Furthermore, there are many patents related to spatial light modulation that includes U.S. Pat. Nos. 2,025,143, 2,682, 010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952.

However, these inventions have not addressed or provided direct resolutions for a person of ordinary skills in the art to overcome the above-discussed limitations and difficulties. Therefore, a need still exists in the art of image display systems applying digital control of a micromirror array as a spatial light modulator to provide new and improved systems such that the above-discussed difficulties can be resolved. The largest difficulty to increase gray scale is that the conventional systems have only the ON and OFF states and the minimum ON time exists. The minimum ON time determines the height of the steps of gray scales shown in FIGS. 2A and 2B.

There is no way of providing the brightness lower than the step. If a level of brightness lower than the height of steps can be generated, then the number of gray scales increases and the degradation of picture quality reduced substantially. The previously mentioned pending application Ser. Nos. 11/121,543, 11/136,041 and 11/183,216 provide solutions to improve the number of grayscales.

Although the increase of grayscales can eliminate the artifacts of still pictures, it does not solve so called "temporal artifacts" of pictures in motion.

When a display is controlled digitally and pictures are in motion, temporal artifacts can be observed as illustrated in FIG. 3B showing the same picture but in motion. Some lines in the upper arm and the forehead are even more visible than the artifacts in FIG. 3A.

An example of 8-bit digital signal is illustrated in FIGS. 4A, 4B and 4C. The least significant bit (LSB) of the incoming signal is shown as the left smallest block and the most significant bit (MSB) is shown as the largest block in the right side of FIG. 4A, in which each bit has binary time width that is called a Binary Pulse Width Modulation (PWM). The LSB has the minimum unit of time width and the MSB has the maximum time width in a frame. If all of the bits are OFF, the output will be zero. All the bits from the first to seventh are ON and the eighth bit is OFF, and the output is 127 as in FIG. 4B. All the bits from the first to seventh are OFF and the eighth bit is ON, and the output is 128 as in FIG. 4C.

These two signals differ numerically by one ("1"); their displayed times, however, are very different. The first one is in the first half of the frame; and the second one is in the latter half of the frame.

Human eyes have a certain response time to an incoming light. If two light pulses enter eyes in a short time interval, the eyes recognize them as a single light pulse. As the time interval becomes larger, the eyes start recognizing them as two light pulses. This response time of human eyes are considered as about 20 milliseconds or 50 Hz. Because we often recognize the flicker of TVs in Europe where TVs are scanned in 50 Hz, but we do not recognize the flicker in the US where TVs have a scanning frequency of 60 Hz.

Because of the response time of human eyes and the frame frequency being higher than 60 Hz, the time interval between the pulse in FIG. 4B and that in FIG. 4C is short enough, and the integration of light by human eyes makes the picture look smooth enough. However, if the two pixels having 127 and 128 brightness levels as shown in FIGS. 4B and 4C are adjacent to each other and the pattern is moving, another type of artifacts take place. This is called "temporal artifacts".

FIG. 5 illustrates the reason why these artifacts take place. When a picture is in motion, the viewer's eyes chase the object. The integration of incoming light by the viewer's eyes is performed with two adjacent pixels rather than a single pixel as the case of still pictures. If the display is controlled with digital signals and a pixel is ON in the latter half of a frame period as shown in FIG. 4B and the adjacent pixel is ON in the first half of the frame, the light integration in the viewer's eyes will have a duplicated intensity as the brighter lines shown in FIG. 5. This phenomenon has been well known as temporal artifacts of a plasma display. However, these artifacts are not limited to a plasma display and can take place with any digitally controlled displays. The present invention provides the solutions to eliminate or reduce temporal artifacts.

According to above discussions, FIGS. 1A through 1D illustrate conventional display and FIGS. 2A and 2B illustrate the definition of gray scale and the artifacts arising from low gray scale representation when applying the conventional display systems of FIGS. 1A to 1D. FIG. 3A shows an example of the artifacts using a photo of a female wherein there are visible unnaturally bright lines or areas in the forehead and the upper arm due to an insufficient number of grayscales. FIG. 3B shows an example of temporal artifacts that show the unnatural lines that are clearly observable in a display image. FIG. 5 illustrates the reason why these unnatural lines are created. As shown in FIGS. 4B and 4C, a single increment of brightness can cause a major separation of the ON times between two adjacent pixels, because the brightness level of 127 having its ON time in the first half of a frame and the brightness level of 128 will have the ON time in the latter half of the frame. When the pattern, such as the female object, is moving in the screen, the viewer's eyes chase the pattern. Because of this movement of view points, the integration of incoming light will no longer take place at the same pixels, but the integration will take place over adjacent pixels. In the case of FIG. 5, the brightness of the $4^{th}$ pixel in the first half of the frame and the brightness of the $5^{th}$ pixel in the latter half of the frame are added. This causes the brightness at the $5^{th}$ pixel unnaturally brighter than the adjacent area. The artifacts shown in FIG. 3B are extremely uncomfortable to a viewer. The elimination of this type of artifacts is highly desirable.

Accordingly, improvements in the display systems are necessary to prevent such a degradation of image quality. Therefore, a need still exists to further improve the image display systems such that the above discussed difficulties and limitations can be resolved.

SUMMARY OF THE INVENTION

One aspect of the present invention is to eliminate or reduce temporal artifacts by eliminating the causes of temporal artifacts due to the alternating intervals of ON states in a frame. By rearranging the ON states and off states in a frame period of display the artifact is reduced or eliminated.

Another aspect of the present invention is to reduce the large time intervals among ON states of pixels by applying a non-binary PWM for upper bits, so that the time intervals in a frame time of display is minimized.

In a preferred embodiment, the control process of the display system of this invention apply a method of converting the most significant m-bit of the incoming signal to a non-binary single ON pulse located either at the beginning of a frame or at the end thereof, and the lower residual bits are displayed with intermediate states.

BRIEF DESCRIPTION OF THE DRAWINGS

The above-noted objects of this invention and other objects will become apparent from the following detailed description and claims when they are read in conjunction with the accompanying drawings herein:

FIG. 2A shows an example of an insufficient number of grayscales where the minimum step of brightness change is very large and the artifacts are well visible;

FIG. 2B shows an example of an improved grayscale, where the artifacts are less visible;

FIG. 19 is a conceptual diagram showing a configuration of a projection apparatus according to a preferred embodiment of the present invention;

FIG. 20 is a conceptual diagram showing a configuration of a single-plate projection apparatus according to another preferred embodiment of the present invention;

DESCRIPTION OF THE PREFERRED EMBODIMENTS

Reference is now made to the above listed Figures for the purpose of describing, in detail, the preferred embodiments of the present invention. The Figures referred to and the accompanying descriptions are provided only as examples of the invention and are not intended in anyway to limit the scope of the claims appended to the detailed description of the embodiment. Specifically, exemplary embodiments of the present invention are described below by referring to FIGS. 6 through 21.

Figure 6:
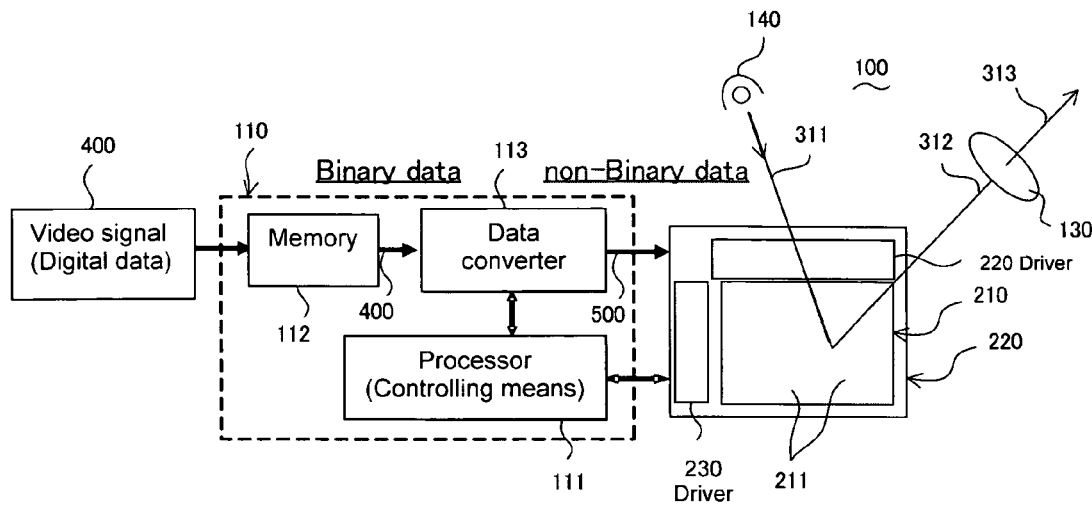
FIG. 6 illustrates an example of the basic architecture of an embodiment.
Figure 7:
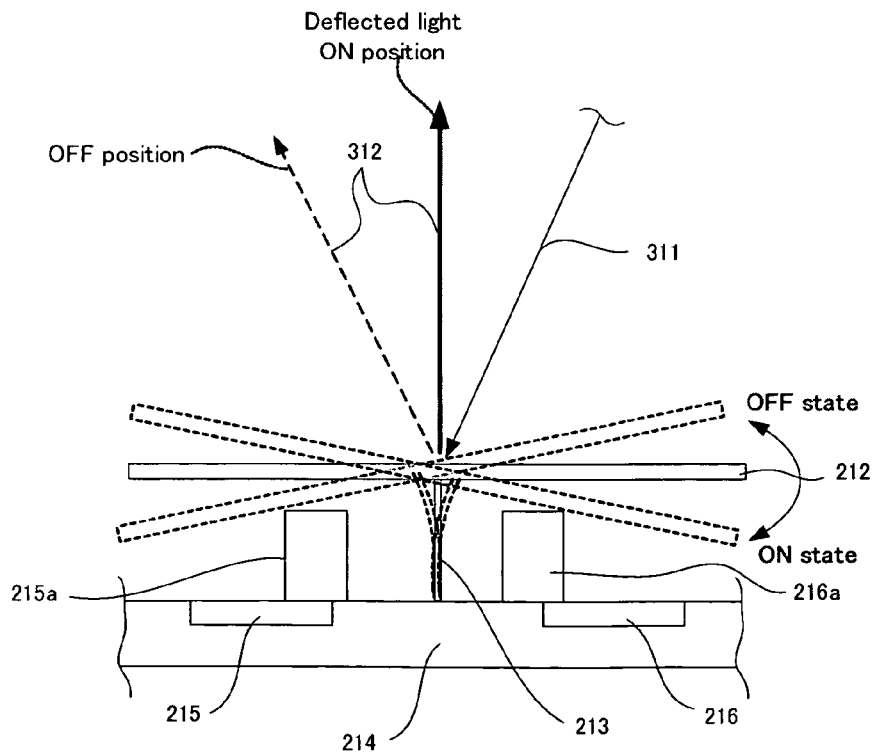
FIG. 7 illustrates an example of micromirror devices.

FIG. 6 is a functional block diagram for showing an exemplary configuration of a projection display apparatus that implements a control method according to the present invention. FIG. 7 is a side cross sectional view of an exemplary configuration of a pixel unit of the spatial light modulation device implemented in a projection display apparatus.

Referring to FIG. 6 for a projection display apparatus 100 that includes a spatial light modulation device (SLM) 200, a control apparatus 110, a projection optical system 130 and a light source optical system 140. The projection optical system 130 projects a projection light 313 on a display screen (not shown) a light source 140 emits an incident light 311. The spatial light modulation device 200 receives the incident light 311 and reflects a reflection light 312. The display system further includes a control apparatus 110 comprises a processor 111, frame memory 112 and a data converter 113. The processor 111 includes a microprocessor to control the operation timing of the control apparatus and the spatial light modulation device 200.

The frame memory 112 retains the input digital video data (i.e., binary data 400) received from an external device (not shown). The amount data received and retained in the frame memory is for the operation and control in a duration of one frame. The binary data 400 is updated for the display of one frame. The data converter 113 processes the binary data 400 read from the frame memory 112 as described below to generate output data as non-binary data 500 comprising a bit string. The spatial light modulation device 200 then applies a predefined weighting factor to each bit of the bit sting as will be further described below.

In this exemplary embodiment, the spatial light modulation device 200 comprises a pixel array 210, a column driver 220 and a row driver 230. A plurality of pixel units 211 is disposed at the intersections of the vertical bit lines (not specifically shown) extended from the column driver 220 with the horizontal word lines (not specifically shown) extended from the row driver 230.

FIG. 7 shows each of the pixel units 211 comprises a mirror 212 supported on a hinge 213 on a substrate and the mirror 212 is allowed to freely swing to different tilt angle relative to the hinge 213.

The mirror element further includes an OFF electrode 215 and an OFF stopper 215a disposed symmetrically across the hinge 213, and likewise an ON electrode 216 and an ON stopper 216a are disposed, on the substrate 214. The OFF electrode 215 is applied with a predetermined voltage for generation a Coulomb force to draw the mirror 212 to incline to an angular position to physically contact the OFF stopper 215a. The mirror 212 reflects the incident light 311 to the light path of an OFF direction that is directed away from the optical axis of the projection optical system 130. The ON electrode 216 is applied with a predetermined voltage for generation a Coulomb force to draw the mirror 212 to incline to an angular position to physically contact the ON stopper 216a. The mirror 212 reflects the incident light 311 to the light path of an ON direction that matches with the optical axis on the projection optical system 130.

Figure 8:
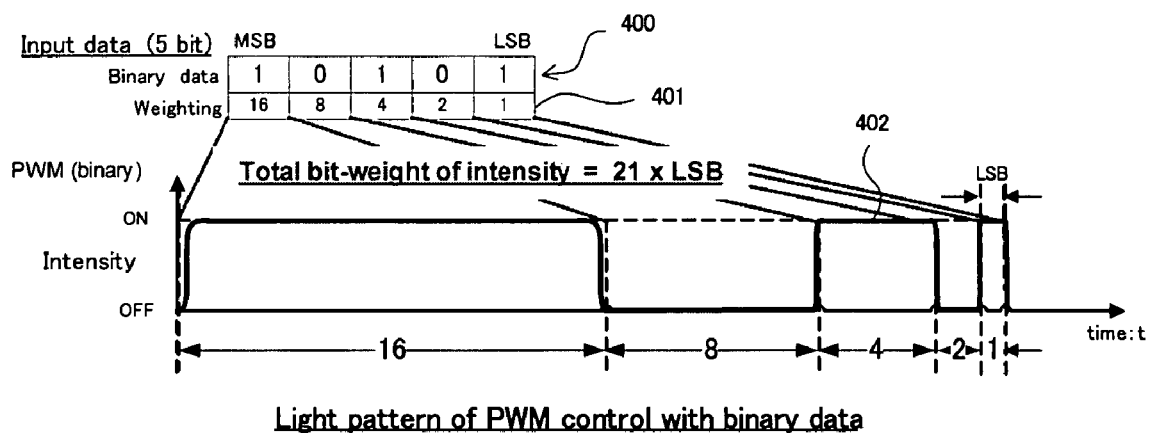
FIG. 8 illustrates a conventional binary PWM.

Referring to FIG. 8 for a description that explains an operation process of an exemplary embodiment. FIG. 8 shows an example of conventional binary PWM, where each bit has a predetermined weighting factor as a multiplier to generate the length of time in applying a bit for controlling the a mirror element. This method is easy to implement because of the simplicity in driving the pixels to ON if the bit is "1" and to OFF if the bit is "0".

Figure 9:
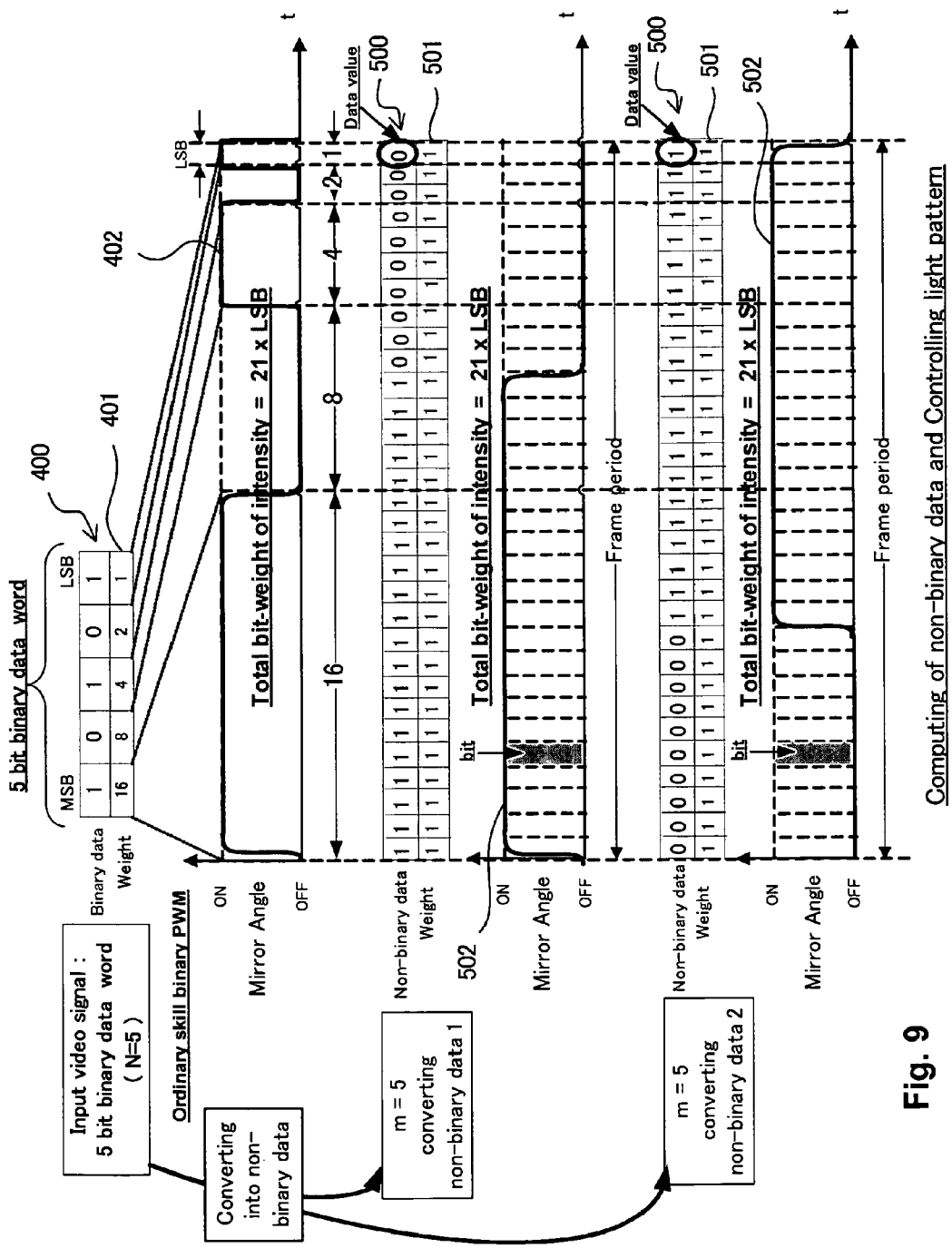
FIG. 9 exemplifies the basic system according to an embodiment of this invention using 5-bit incoming binary signals.

However, the method as shown in FIG. 8 leads to even more severe problems of display artifacts due to the fact that the mirrors are controlled by applying separated multiple pulses and also with widely spread ON times within a frame. FIG. 9 shows the exemplary embodiments of this invention wherein the ON times are integrated into one continuous pulse. The pulse width control scheme of the second row is marked as "Non-binary light pattern 1". The time slots designated with ON pulses are placed in the beginning of a frame. The time slots of the ON pulses among adjacent pixels coincide with each other.

The pulse width control scheme of the third row is marked as "Non-binary light pattern 2". The control scheme illustrates another example in which the ON pulses are located at the end of a frame. This also ensures that the ON time slots among adjacent pixels coincide with each other. The minimum time slice of pattern 1 and 2, indicated as "bit" in FIG. 9, correspond to a minimum controllable time duration as designated by the LSB of the original incoming signal.

By applying the binary data 400 as represented by the waveform shown in FIG. 8 for controlling the ON/OFF positions of a mirror leads to instability of the mirror oscillations. The control pattern 402 cannot provide a stabilized control pattern due to the distributed patterns of the ON periods in a period of one frame. Such instability is due to the "1"/"0" binary control scheme and the weighting factor applied to each bit to generate the total ON period corresponds to the brightness of the display pixel.

In contrast, in the case of the present embodiment, the binary bits are converted into the non-binary data 500. The non-binary bits as applied prevent the ON period and OFF period from being dispersed within one frame. Therefore, the ON and OFF periods are definitely separated into two longer consecutive periods that prevents the instability of mirror oscillations. Specifically, the mirror control pattern 502 is generated by the non-binary data 500. In the non-binary data, the bit string of "1" is applied first, followed by application the bit string of "0" for controlling the oscillation of the mirror element. The binary pattern 1 on the second row of FIG. 9 described above clearly illustrates such control operations. The weighting factor 501 of the non-binary data 500 is "1" which is equal to the LSB of the binary data 400.

The instability problem is resolved as the ON period continues for consecutive number of the bits of "1" from the beginning of one frame, followed by the OFF period corresponding to the bit string of "0". Unlike the conventional PWM control process, the control of the ON period or OFF period are no longer randomly distributed within one frame because the ON-OFF patterns are not strictly corresponding with input digital video data as that exemplified by the binary data 400 The improved control process by applying the converted non-binary thus reduces the noise of control signals that often leads to problems such as temporal artifacts of an image displayed by the mirror control pattern of the non-binary data 500.

The third row of FIG. 9 designated as a non-binary bit patter 2 illustrates a method for generating a mirror control pattern 502. The non-binary data with the bit of "0" is applied first to control the mirror in an OFF state corresponding to the number of bits of "0". The control process then applies the "1" bits to keep the mirror at an ON state for consecutive time slots according to the number of bits of "1". By separating the ON-OFF state of the mirrors 212 into integral consecutive periods of time within a display frame reduces the problems of artifacts in the image display.

Figure 10:
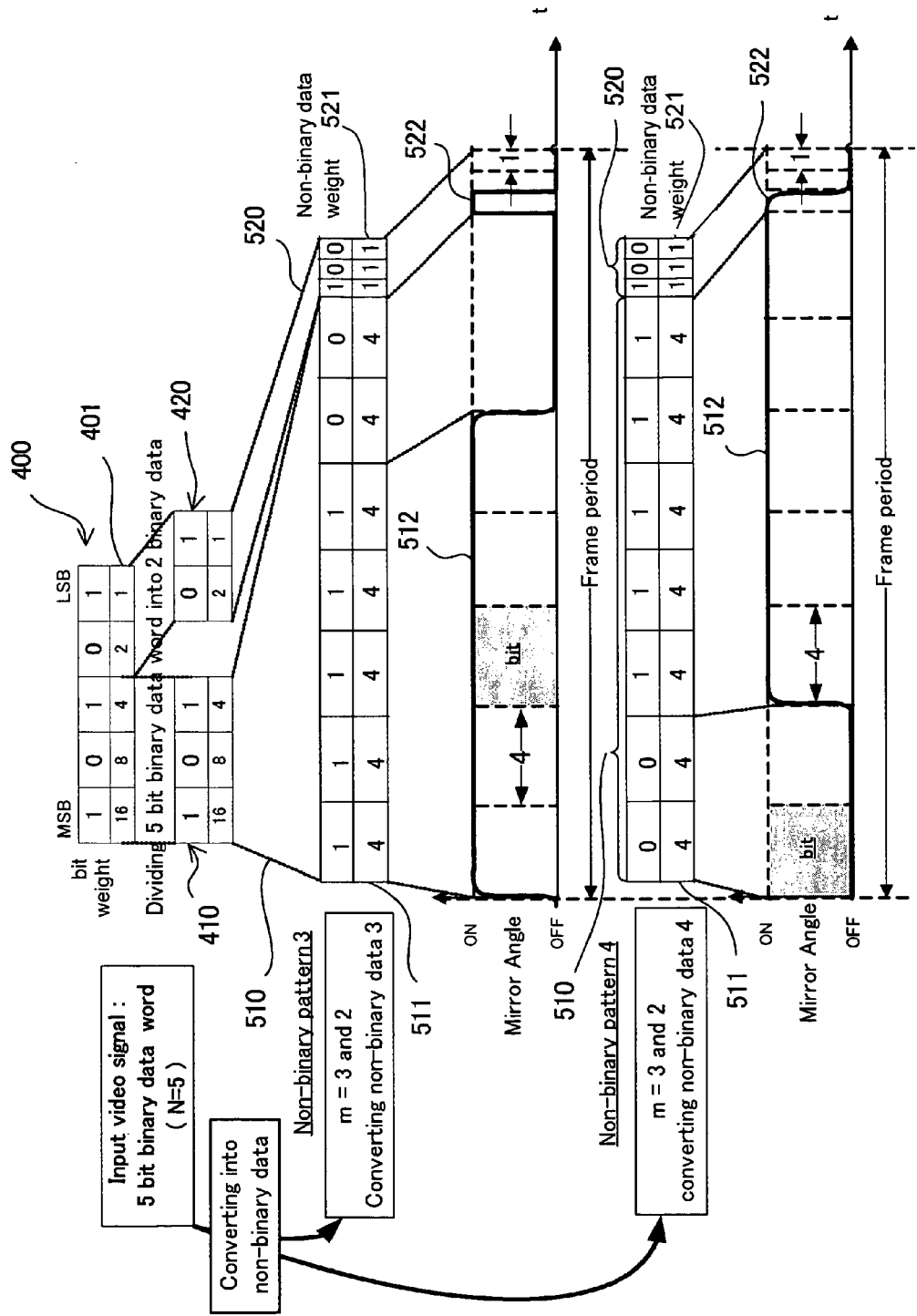
FIG. 10 illustrates another example of embodiments, wherein 5-bit incoming binary signals are divided into 3 bits with the LSB of the third bit and 2 bits with the fifth bit LSB.

FIG. 10 illustrates an alternate embodiment of the control process of this invention. The row marked as "Non-binary pattern 3" divides the incoming signal into two sets of data. The upper bit data have a larger minimum time slice, or bit. The lower bit data has a smaller minimum time slice that is the same as the least significant bit (LSB) of the original incoming signal. This control process reduces the burden for the system designers because the number of calculations is reduced. The ON time in pattern 3 is arranged at the beginning of a frame and in the control pattern 4 shown on the third row the ON period is arranged at the end of a frame. Both control processes reduce the unnecessary ON-OFF alternations within a frame period. Specifically, the control process of FIG. 10 divides a 5-bit binary data 400 into two pieces of binary data 410 and 420 to convert the binary data into a non-binary represented by pattern 3. Then different weighting factors are applied to these two pieces of binary data 410 and 420 to generate the non-binary data 510 and non-binary data 520, respectively.

The weighting factor 521 of the non-binary data 520 is generated from the binary data 420 corresponding to the lower two bits of the binary data 400 and is set to "1" which is the same as that of the least significant bit of the binary data 400. Meanwhile, in the non-binary pattern 4 shown in the lower row of the non-binary pattern 3 shown in FIG. 10, the weighing factor of the non-binary data 510 is generated from the binary data 410 corresponding to the upper three bits of the binary data 400 and that is set to "4", The multiplier applied to these bits is four times that of the non-binary data 520.

The total number of bits (i.e., the number of sub-frames) of the non-binary data 510 and non-binary data 520 is reduced compared to number of bits represented by the decimal value of the binary data 400. And the non-binary pattern 3 illustrates a case of generating a mirror control pattern 512 and a mirror control pattern 522 by applying the bit string of "1" for each of the non-binary data 510 and non-binary data 520. Meanwhile, the non-binary pattern 4 shows the processes of generating a mirror control pattern 512 and a mirror control pattern 522 by applying first the bit string of "0" for the first non-binary data 510, followed by first applying the bit string of "1" to generate the non-binary data 520.

In controlling the mirror by applying the non-binary pattern 4, the ON state of the mirror is integrated as one period instead of distributing into a plurality of ON states within one frame. The ON state of the preceding mirror control pattern 512 and the ON state of the ensuing mirror control pattern 522 of the non-binary data 520 are integrated as continuous period thus significantly suppress the display of the temporal artifacts. In the meantime, the control process is achieved by applying reduced amount of non-binary data.

Figure 11:
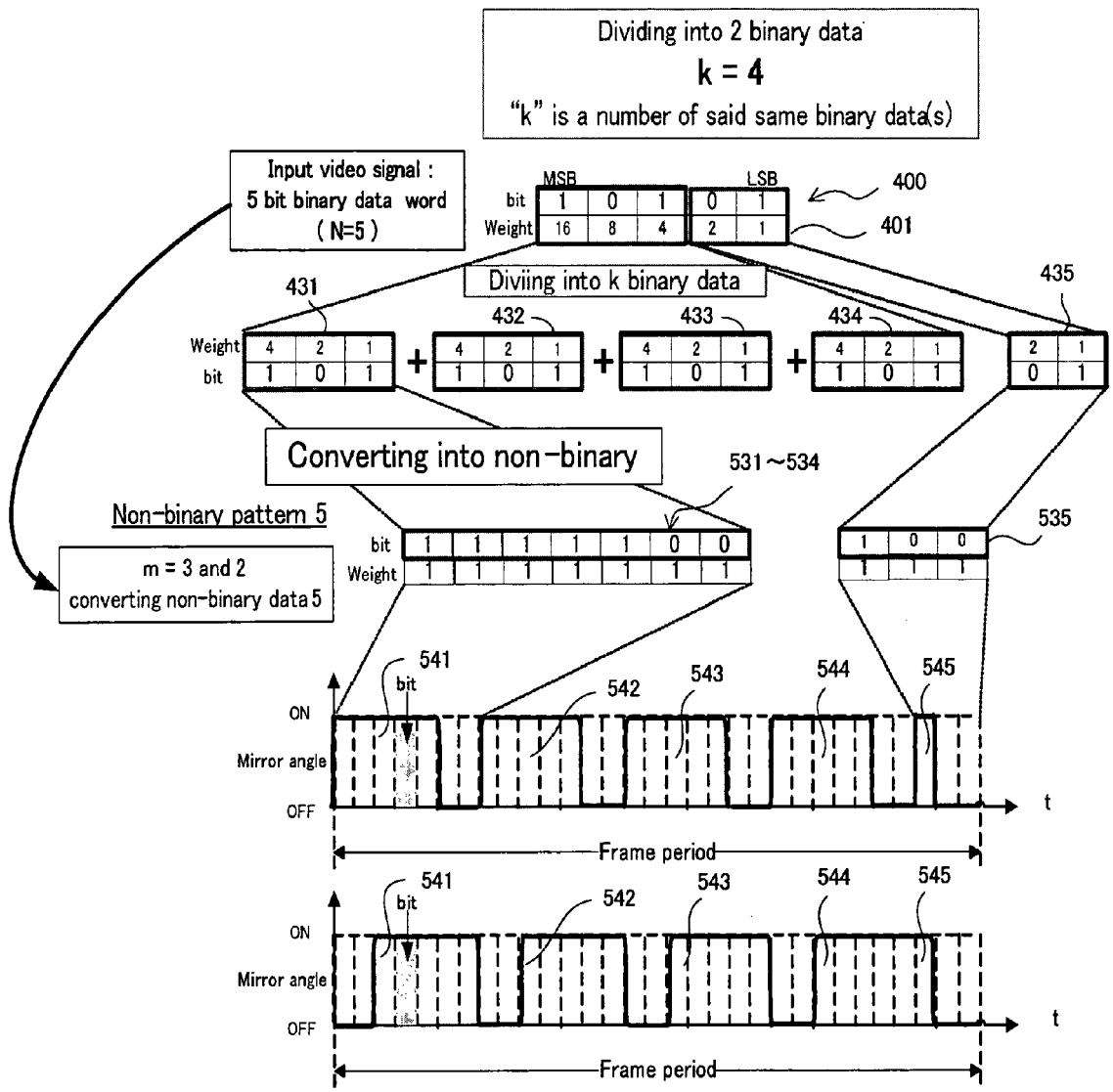
FIG. 11 illustrates another example of embodiments, wherein 5-bit incoming signals are divided into two sets of data with the upper bit data being further divided into 4 sets of data.

FIG. 11 illustrates another exemplary embodiment of the control process according to this invention. The incoming data is divided into two sets of data, i.e., upper bits and lower bits. The upper bit data is further divided into four sets of data of equal value. These four sets of data of equal value are distributed in a frame so that the time differences of between the times when the mirror is controlled at an ON state can be even more reduced. In addition to the benefit of reducing time interval, this control process also has additional benefits for operations that involve the application of a high-speed color wheel because this division of control time slots can be implemented to synchronize with multiple-segmented color wheels.

The upper bits of the binary data according to the control process shown in the non-binary data pattern 5 is divided into four pieces of equal-bit binary data 431, 432, 433 and 434. These four binary data are then processed to generate four pieces of seven-bit non-binary data 531, 532 and 533 and a mirror control pattern 544 corresponding to the respective pieces of the binary data. Then, a three-bit non-binary data 535 is generated from the binary data 435 of the lower two bits of the binary data 400. The upper row of the non-binary pattern 5 shown in FIG. 11 illustrates the process of generating mirror control patterns 541, 542, 543, 544 and mirror control pattern 545 by applying the bit string of "1" first in each piece of the non-binary data 531, 532, 533, 534 and non-binary data 535. Meanwhile, the lower row of the non-binary pattern 5 illustrates the process of generating the mirror control patterns 541, 542, 543, 544 and mirror control pattern 545 by applying the bit string of "0" first for the beginning non-binary data 531, 532, 533 and 534, followed by applying the bit string of "1" first for the later parts of the non-binary data 535.

The lower row of the non-binary pattern 5 shows a process that achieves a significant suppression of the temporal artifacts by arranging the ON state of the former mirror control pattern 544 followed immediately by the ON state of the mirror control pattern 545 of the latter non-binary data 535. The mirror control patterns 541, 542, 543, 544 and 545, corresponding to the aforementioned pieces of non-binary data are applied in the time period to synchronize with each color segment of the color wheel during the period of one frame.

Figure 12:
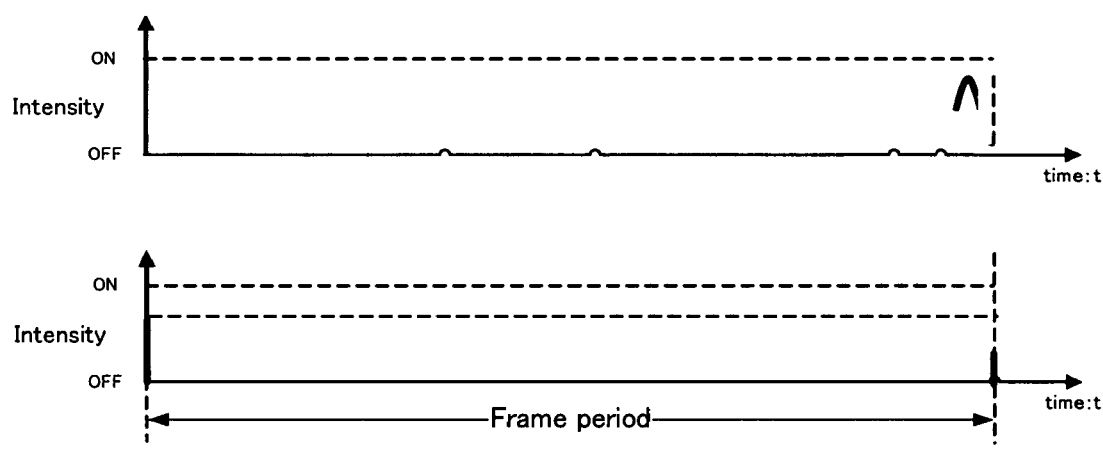
FIG. 12 illustrates various types of intermediate states.

FIG. 12 illustrates another exemplary embodiment of the control of a micromirror device operated with multiple intermediate states. In Example-1, an oscillating state of the mirror is controlled to position between the ON and OFF states and applied as an oscillating state for controlling the modulated light for displaying a projected image. Example-2 illustrates another example of an intermediate state using an oscillation state of the mirror between the locations before the ON or OFF. Example-3 illustrates another example of an intermediate state using two oscillation states of the mirror between the locations before the ON or OFF.

Figure 13:
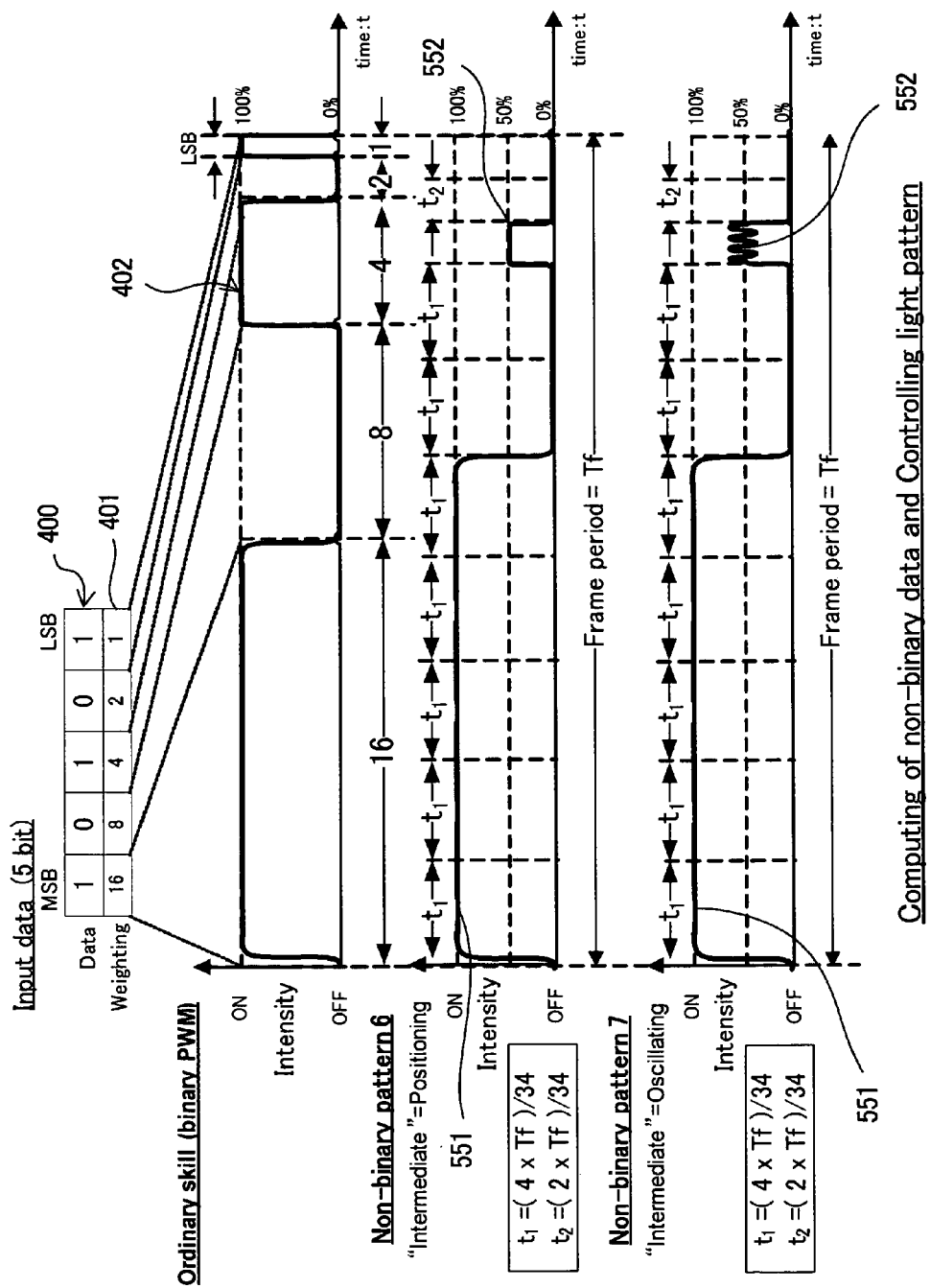
FIG. 13 illustrates another example of embodiments, wherein the incoming 5-bit data is divided into 2 sets of data with the lower bits being driven with intermediate states.

FIG. 13 shows another example of applying a Non-binary pattern 6 where the lower bit data is displayed with a stationary intermediate state. Pattern 7 illustrates another example of applying a non-binary data in which the lower bit data is displayed with an oscillation state.

The non-binary pattern 6 and non-binary pattern 7 include a mirror control pattern 551 generated from non-binary data that is applied to define a time width equivalent to a 3/34 of one frame display period Tf to applying as a weighting factor of one bit with time width being t1. A mirror control pattern 552 is applied that is generated from non-binary data for determining a time width equivalent to a 4/34 of one frame display period Tf to apply as the weighting factor of one bit (with time width being t2). The mirror control pattern 552 in the non-binary pattern 6, controls the brightness by operating the mirror in the angular positions of an intermediate state that will be further described below. The mirror 212 stops between the ON and OFF states as described later. In contrast, the mirror control pattern 552 of the non-binary pattern 7 controls the brightness of the image display by operating the mirrors 212 in an oscillation state that will be further described below.

Figure 14:
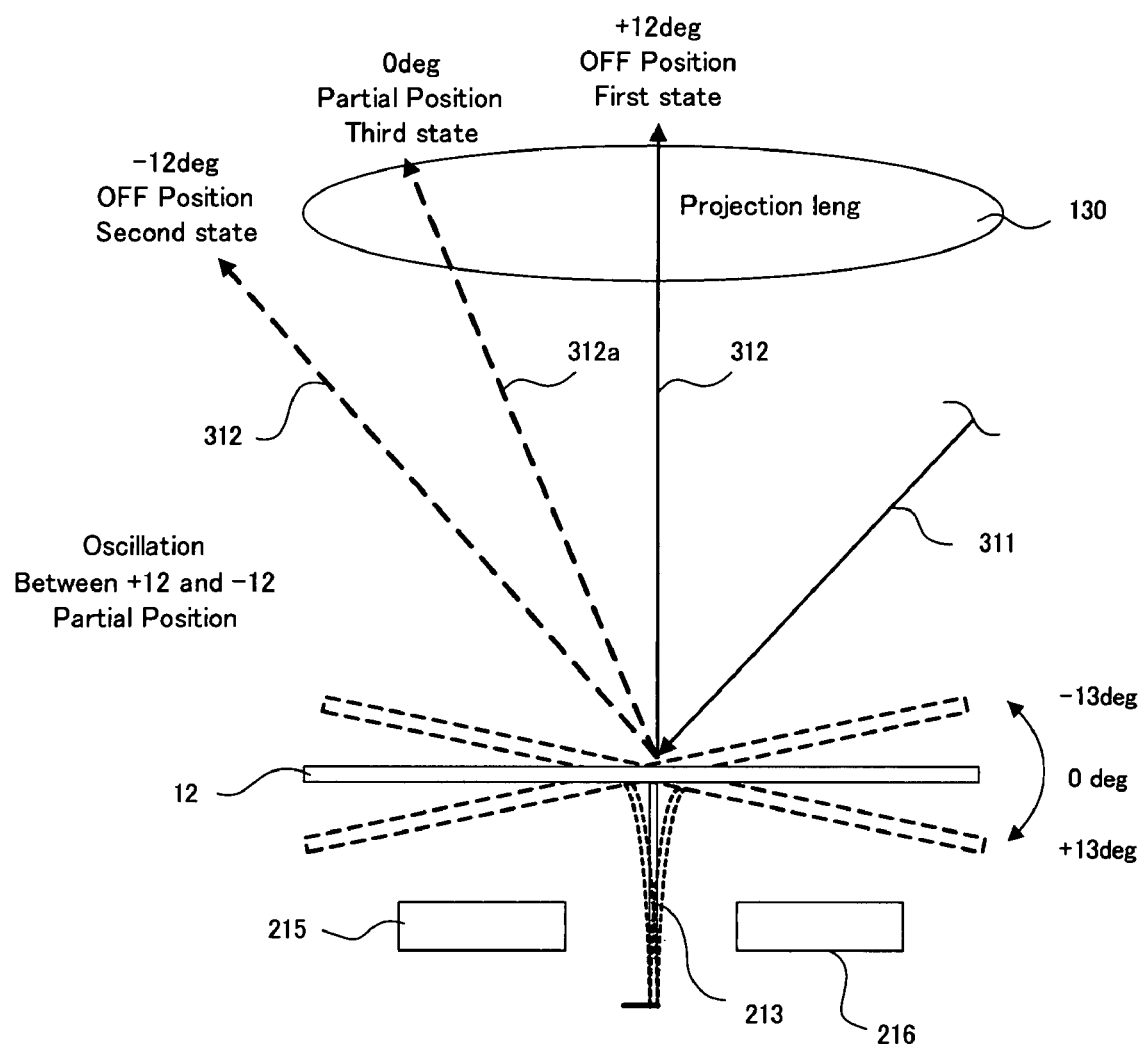
FIG. 14 illustrates an example of a micromirror device having intermediate states using oscillation states.

FIG. 14 is a cross sectional view to illustrate an exemplary embodiment of micromirror devices operated with an intermediate state together with an oscillation state. Specifically, FIG. 14 shows a first state of the mirror 212 inclining in the ON position, a second state of the mirror 212 inclining in the OFF position. Furthermore, the mirror 212 is controlled to stop at a third state as an intermediate position between the ON and OFF states. Alternately, the mirror is controlled to oscillate between the ON and OFF position to operate as an oscillating state.

The mirror control pattern 552 of the non-binary pattern 6 shown in FIG. 13 described above is implemented by controlling the brightness of the display image by using the state of the mirror 212 stopping in the intermediate position between the ON and OFF angular positions. Furthermore, the mirror control pattern 552 of the non-binary pattern is implemented by controlling the brightness of the display image by using the state of the mirror 212 oscillating between the ON and OFF positions.

The method for operating the pixel unit 211 with the intermediate state is described below. The operation is implemented by controlling the oscillation of the mirror 212 between the ON and OFF and by controlling a stoppage between the ON and OFF. The numeral designations for the optical components and various functional units and operational elements shown in the figures below are the same as the above drawings.

Figure 15A:
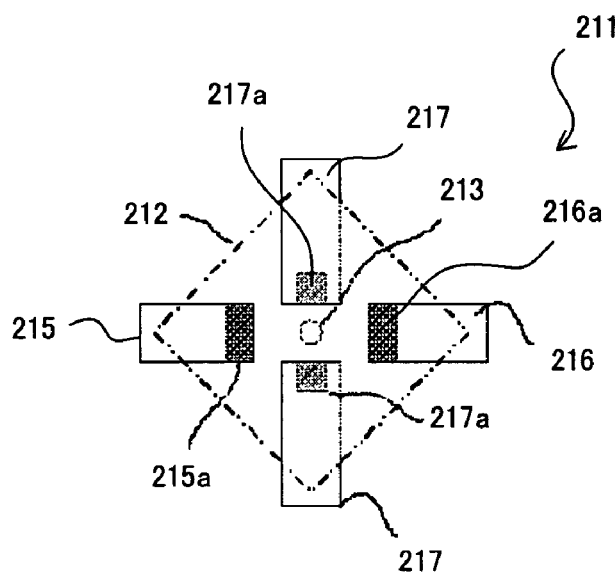
FIG. 15A illustrates an example of a micromirror device having intermediate states using a plurality of rotational axes.
Figure 15B:
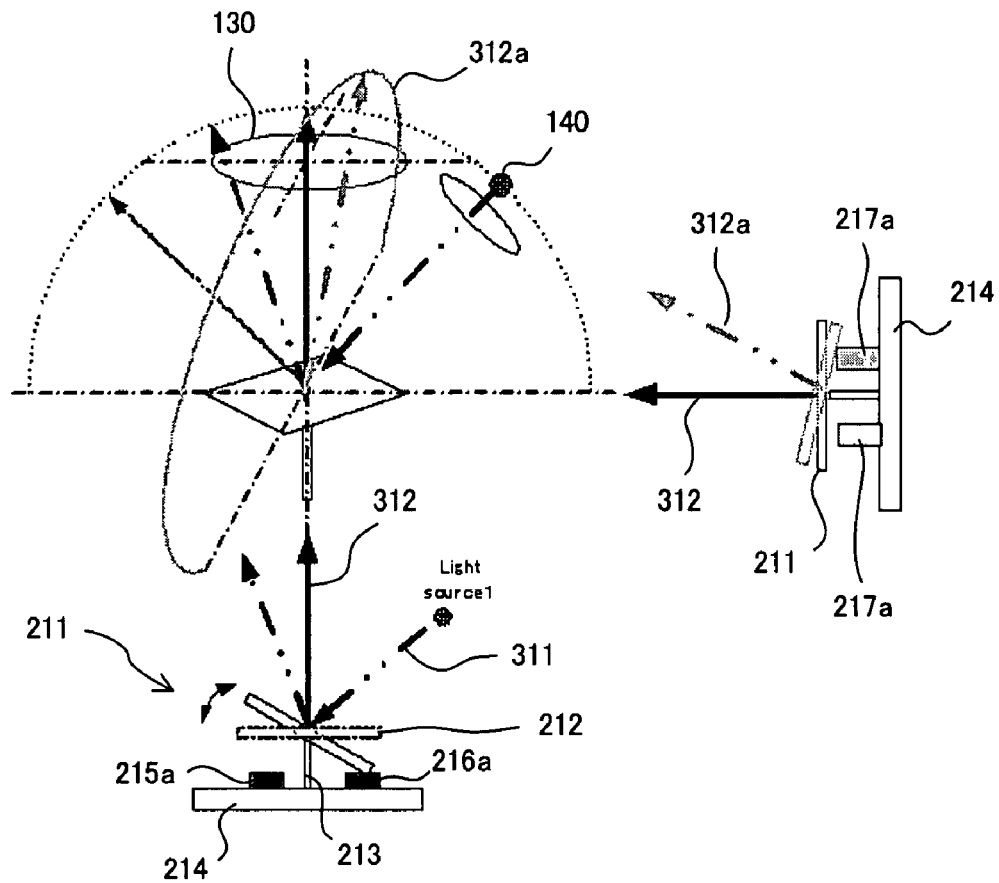
FIG. 15B illustrates an example of a micromirror device having intermediate states using a plurality of rotational axes.

FIGS. 15A and 15B are diagrams for illustrating an exemplary micromirror device operated with intermediate states with multiple rotational axes. Specifically, the micromirror device in FIGS. 15A and 15B includes a set of intermediate electrode 217 and intermediate stopper 217a. The electrode 217 and stopper 217a are placed in approximate symmetrical locations across a hinge 213. The hinge 213 is formed along a vertical direction perpendicular to the lines connecting between the OFF electrode 215 and ON electrode 216. The electrodes 215 and 216 are symmetrically placed on opposite sides of the hinge 213.

The pixel unit 211 shown in FIG. 15B emits an intermediate reflection light 312a projecting along the light path within a solid angle in the space overlapping with the space containing the incident light 311 and reflection light 312. The reflecting light is projected in the intermediate state when the mirror 212 is controlled to incline in the intermediate state. The intermediate state is along the plane containing the direction connecting the OFF electrode 215 and ON electrode 216 by operating the intermediate electrode 217.

Figure 16A:
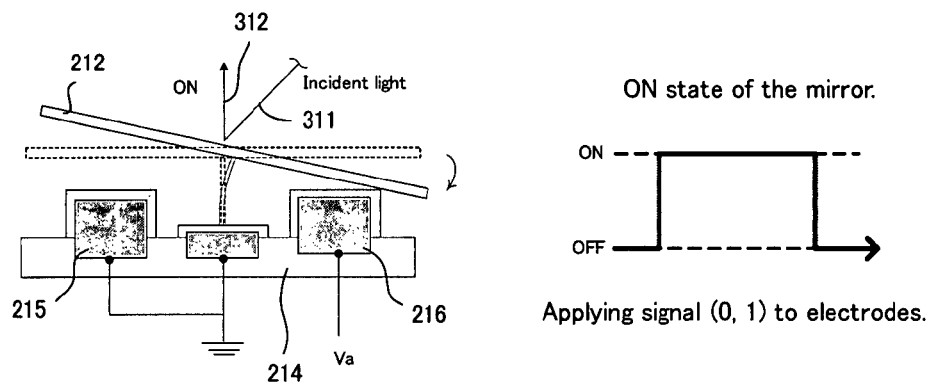
FIG. 16A illustrates an example of a micromirror at an ON state which reflects incoming light fully.
Figure 16B:
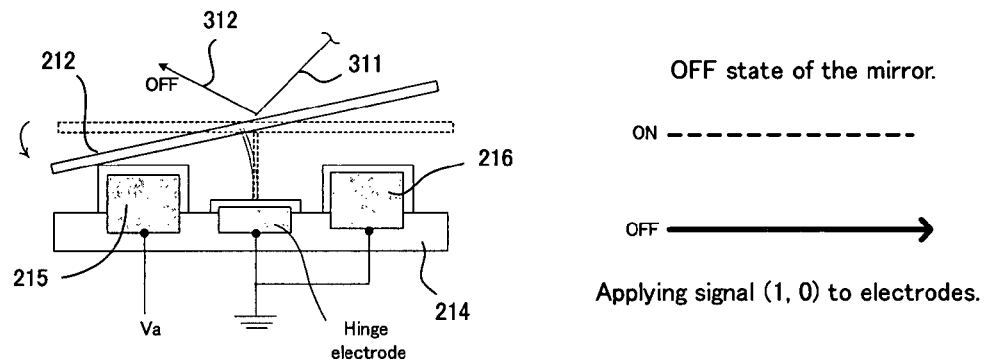
FIG. 16B illustrates an example of a micromirror at an OFF state not reflecting incoming light.

The reflectance can be adjusted by changing the mirror angles as illustrated in FIGS. 16A and 16B. The ON position of a mirror is usually designed for providing the maximum brightness and the OFF position for providing the minimum brightness within the drivable range of angles. By controlling the mirror is in the condition to reflect the light partially, the display system is controllable to project an image with a sub-LSB brightness to increase the gray scales of the display image.

In contrast, a mirror in the conventional system is driven to an ON position by a (0,1) signal to the electrodes disposed beneath the mirror, where the (0,1) is defined as zero volt applied to the left electrode and an ON voltage is applied to the right electrode as illustrated in FIG. 16A. A (1, 0) is applied to drive the mirror to an OFF position.

Figure 1A:
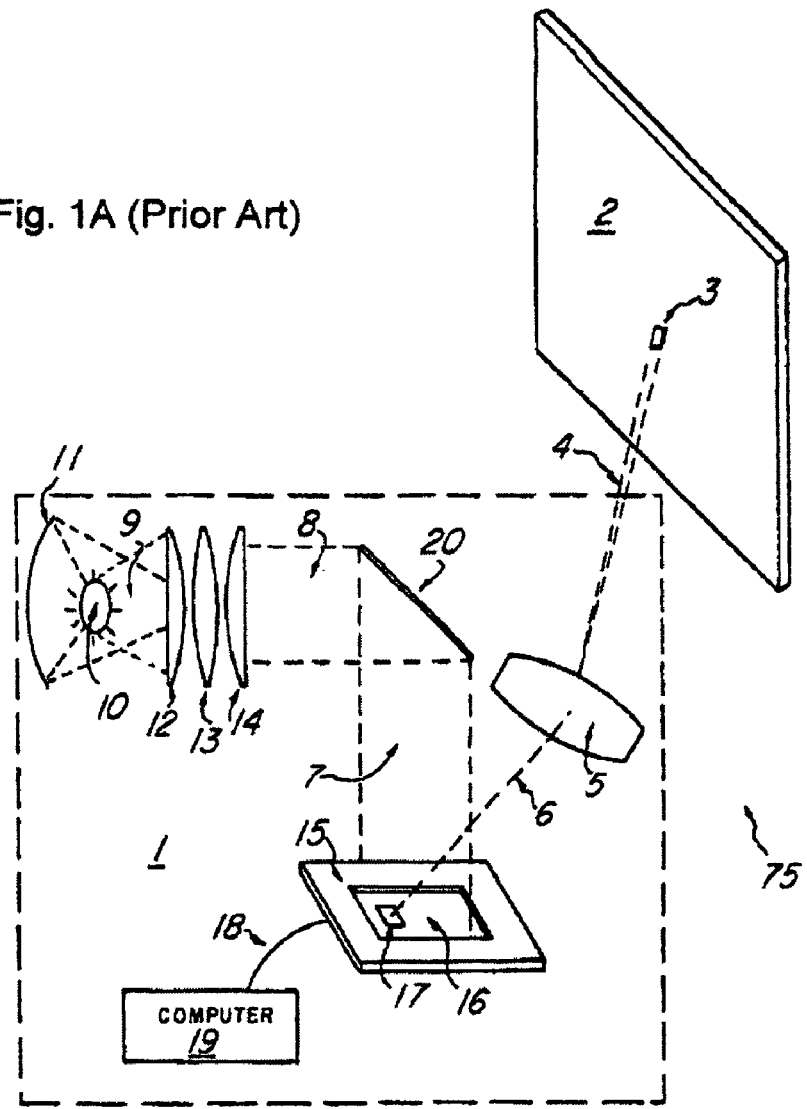
FIG. 1A shows a prior art illustrating the basic principle of a projection display using a micromirror device.
Figure 1B:
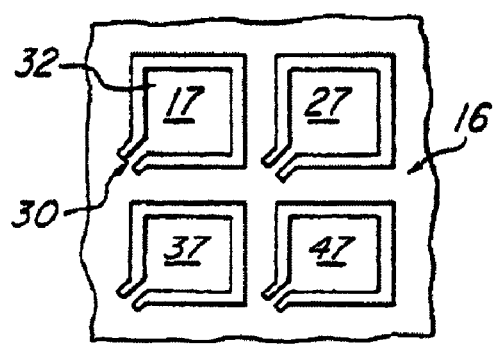
FIG. 1B shows a prior art illustrating the basic principle of a projection display using a micromirror device.
Figure 1C:
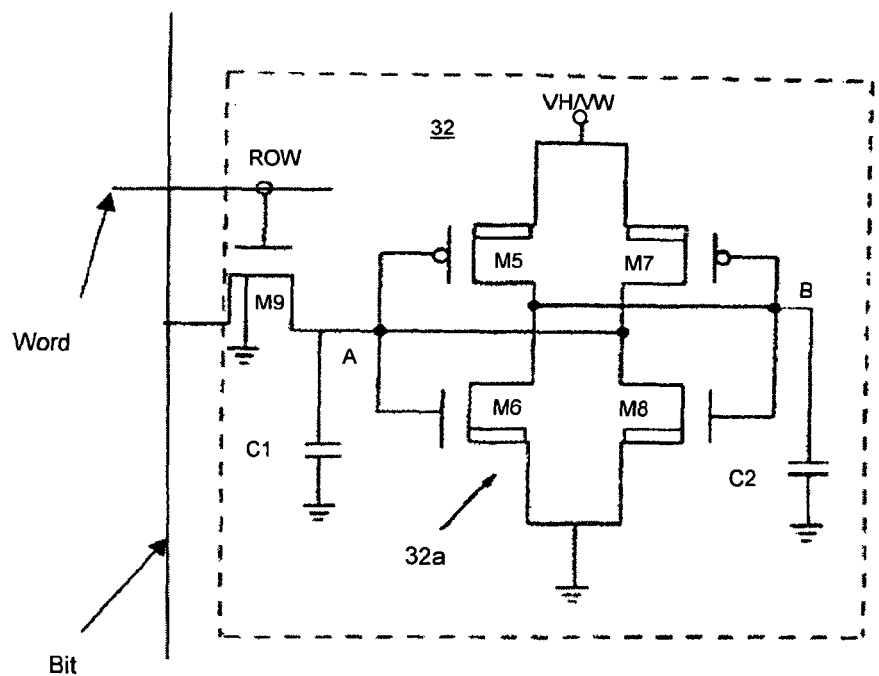
FIG. 1C shows an example of the driving circuit of prior arts.
Figure 1D:
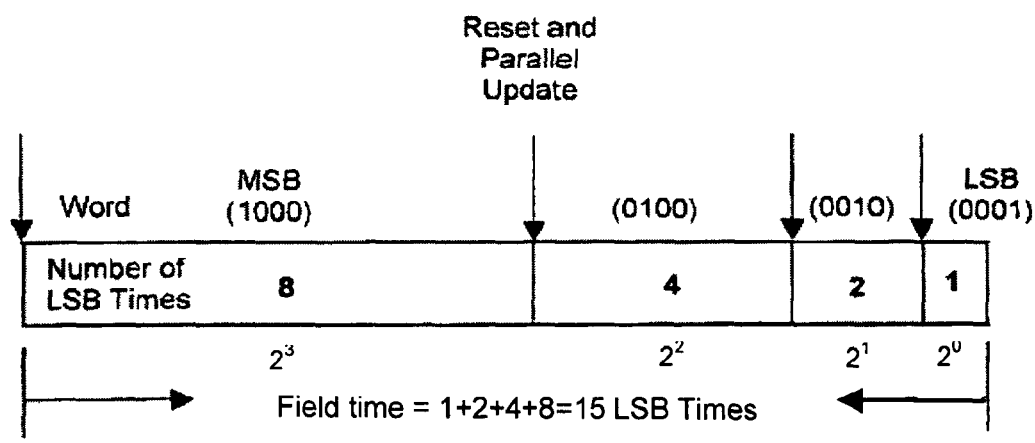
FIG. 1D shows the scheme of Binary Pulse Width Modulation (Binary PWM) of conventional digital micromirrors generating a grayscale.
Figures 3A, 3B:
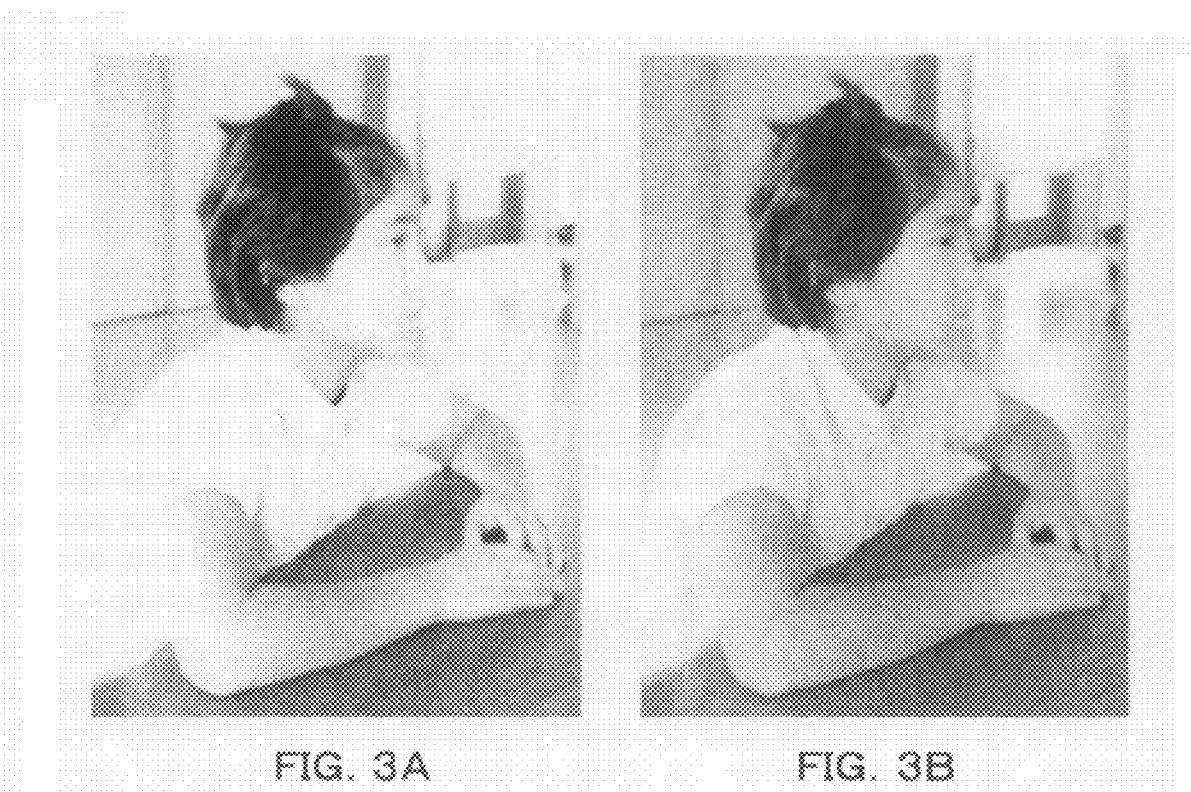
FIG. 3A shows an example of a picture having insufficient grayscale and well visible artifacts.
FIG. 3B shows an example of the same picture with improved grayscale.
Figure 4A:
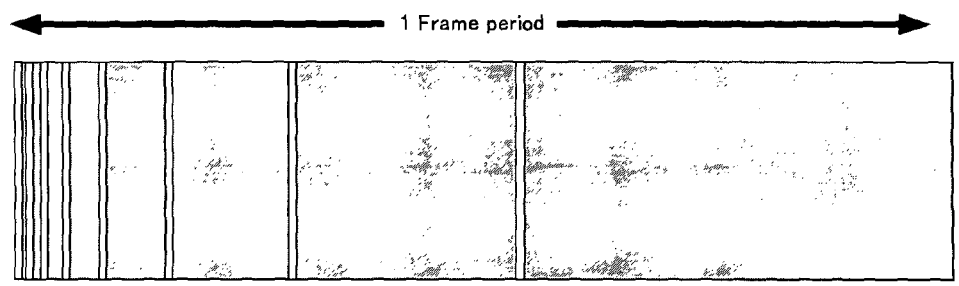
FIG. 4A shows an example of 8-bit digital signal.
Figure 4B:
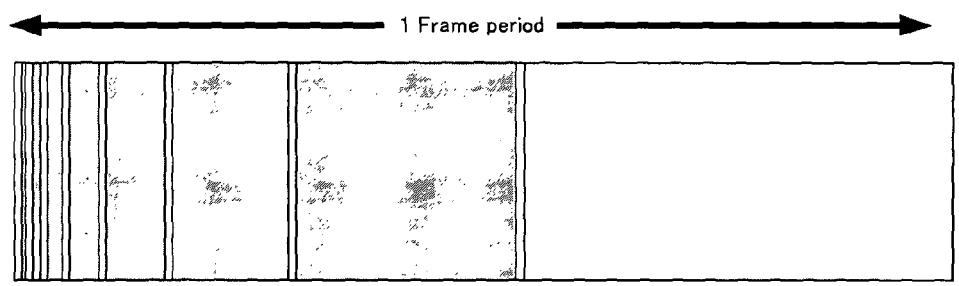
FIG. 4B shows an example of 8-bit digital signal.
Figure 4C:
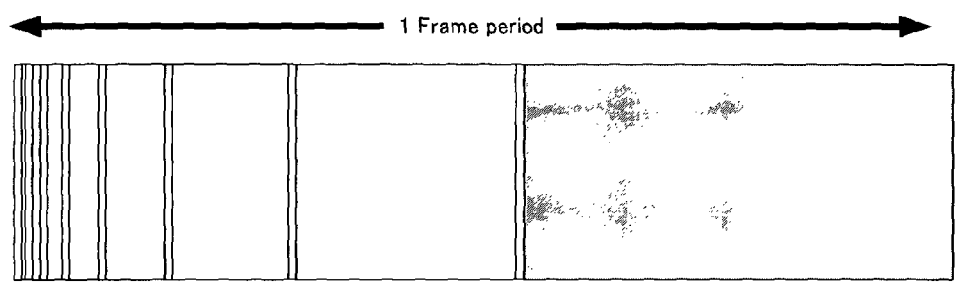
FIG. 4C shows an example of 8-bit digital signal.
Figure 5:
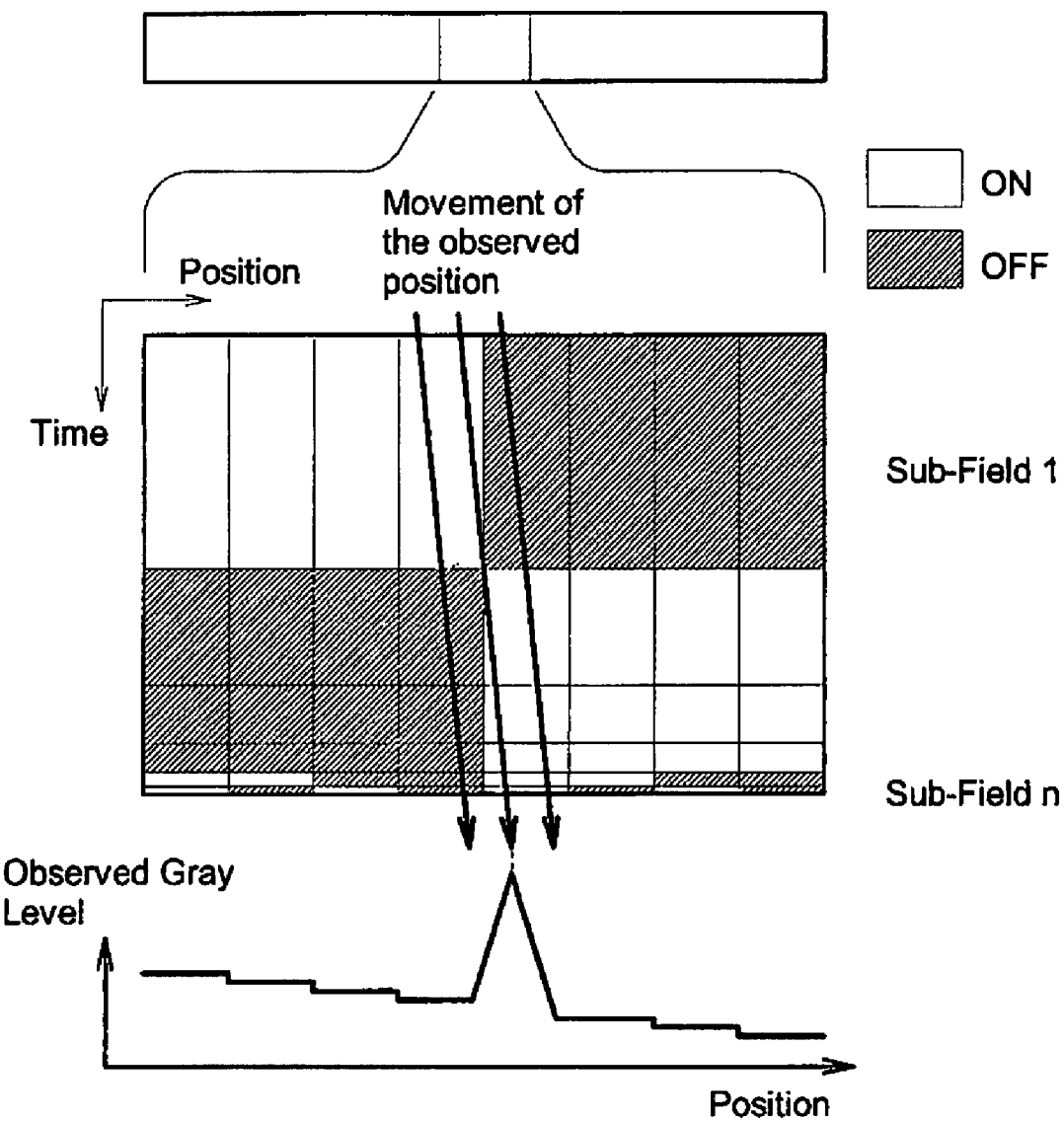
FIG. 5 is a diagram describing a cause an occurrence of temporal artifacts.
Figure 16C:
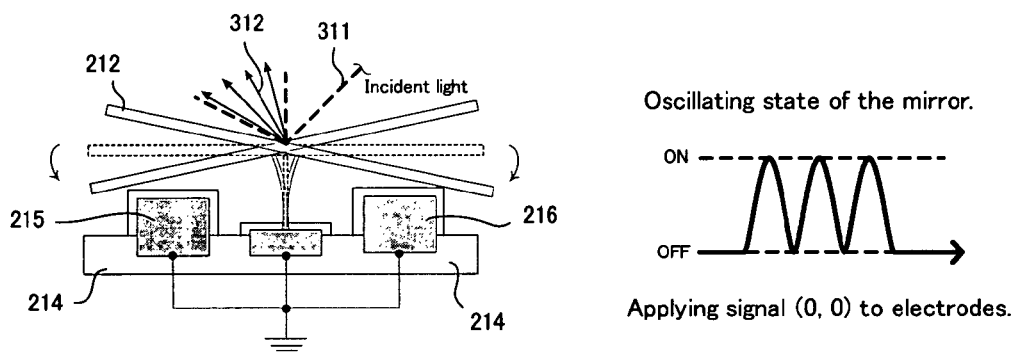
FIG. 16C illustrates an example of a micromirror at an oscillation state reflecting incoming light partially.

FIG. 16C, illustrates a mirror is controlled to operate in an oscillating condition. The light intensity reflected during the mirror oscillation is below that of the ON position. The mirror oscillation is controlled by applying to two electrodes under the mirror with zero volts, or (0, 0). The voltages can be applied to the electrodes when the mirror is in the position of ON or OFF state. In a conventional driving circuit shown in FIG. 1C multi-bit input system is required to operate the mirror in such condition.

Various computerized simulations have calculated the average reflectance from the mirrors operate in an intermediate state or an oscillation state is between 20% and 40% depending on optical configurations. When an optical system is suitably selected, the reflectance can be adjusted to 25%, or ¼. This enables a display system to control the mirrors to modulate a light of a ¼ of output brightness without changing the intensity of incoming light. When multiple pulses are applied to the electrodes disposed under the mirror as illustrated in FIG. 16C, (i.e., the arrows on the left side) in the middle of an ON position, a ¾ of reflectance can also be achieved.

In addition to the configuration described above by using FIGS. 16A, 16B and 16B, each of the arrayed plurality of pixel units as implemented in the spatial light modulation device 200 of the present embodiment can also be configured as follows.

Figure 17A:
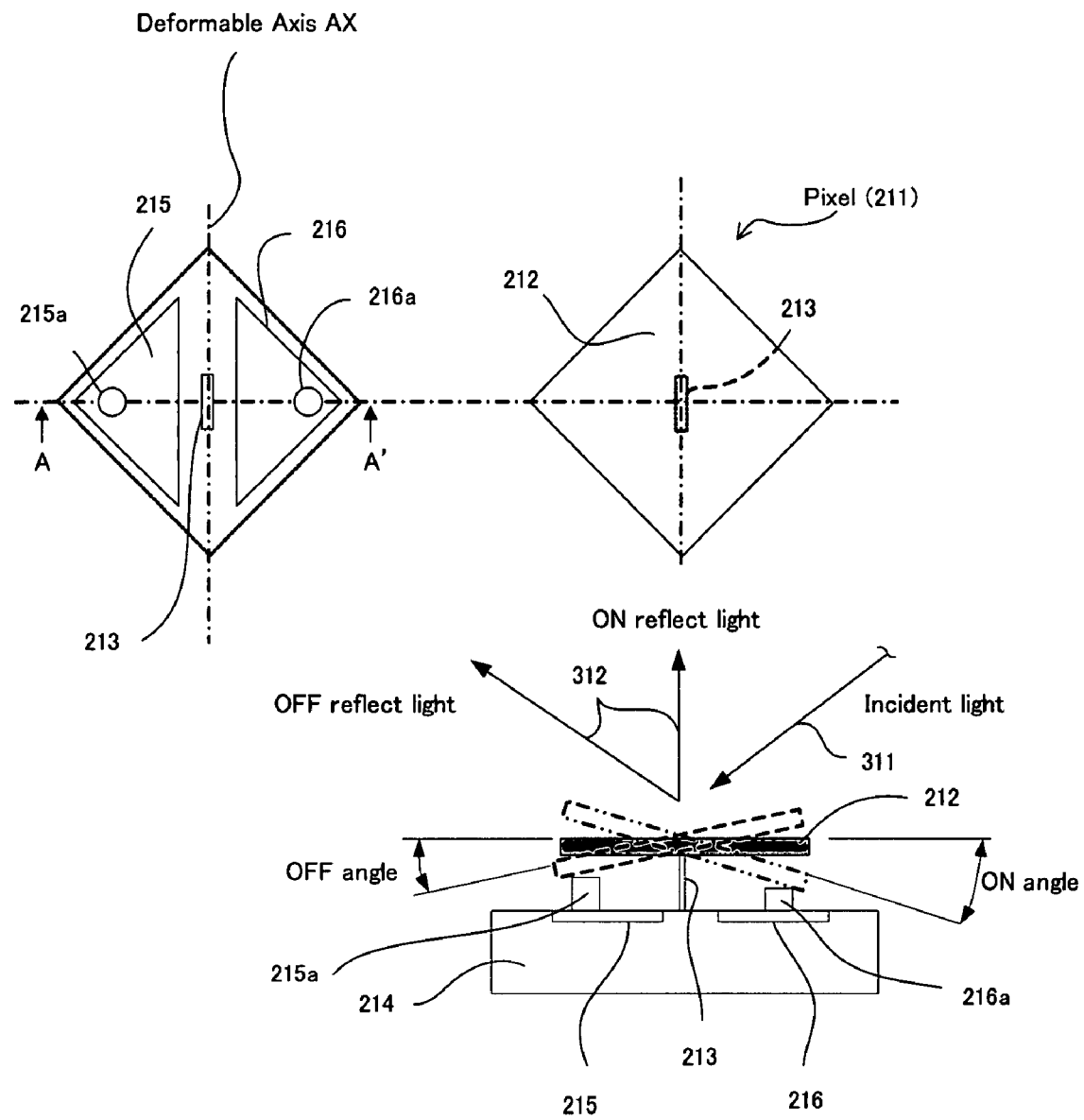
FIG. 17A exemplifies another configuration of a deflection element.
Figure 17B:
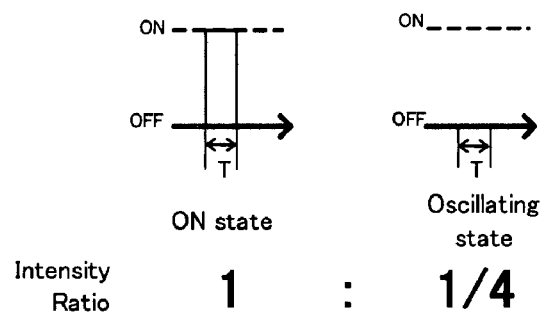
FIG. 17B shows the ratio of light intensity of light transmitting through a projection lens in the ON and oscillation states of a micromirror.

FIG. 17A shows another exemplary configuration of the pixel unit 211. Referring to FIG. 17A, the mirror 212 of the pixel unit 211 supported on a hinge 213 as shown on the upper right side, and a top view of the pixel unit 211 with the mirror removed is shown in the upper left side. Also shown is an A-A' cross-section of the pixel unit 211 with the mirror 212 inclined to different angular position on the bottom of FIG. 17A. As shown in FIG. 17A, the pixel unit 211 according to the present embodiment includes an ON stopper 216a and an OFF stopper 215a on top of the respective electrodes of the ON electrode 216 and OFF electrode 215. The distance between the ON stopper 216a and a deformable axis AX and the distance between the OFF stopper 215a and the ON stopper 216a are the same. Meanwhile, the height of the ON stopper 216a is configured to be smaller than that of the OFF stopper 215a.

With a pixel mirror configured with such a configuration, by applying a predetermined voltage to the ON electrode 216 causes the mirror 212 to move to an ON state and inclining to contact the ON stopper 216a. The mirror reflects the incident light 311 to the projection optical system 130 (refer to the ON reflection light).

The incident light 311 is projected to the mirror 212 at a prescribed perpendicular incident angle to the deformable axis AX. An application of a predetermined voltage to the OFF electrode 215 causes the mirror 212 to move to an OFF angular position and inclining to contact the OFF stopper 215a. The mirror reflects the incident light 311 away from the projection optical system 130 (refer to the OFF reflection light). Furthermore by terminating voltages applied to the OFF electrode 215 when the mirror 212 is in the OFF state causes the mirror 212 to move in an oscillation state. The oscillating mirror reflects the incident light to directions corresponding to the oscillation state of the mirror 212. In a preferred embodiment, the inclination angle of the mirror 212 moved to the ON state (i.e., the ON angle) when the mirror is inclined to +15 degrees, and that of the mirror 212 in the OFF state (i.e., the OFF angle) when the mirror is moved to −13 degrees. In the exemplary embodiment, the height of the ON stopper 216a is smaller than that of the OFF stopper 215a. The incident angle of the incident light 311 is increased when compared to a case in which the heights of the ON stopper 216a and OFF stopper 215a are the same.

Contrarily, however, the mirror may be placed in an oscillation state by terminating the voltages applied to the ON electrode when the mirror is in the ON state by configuring a lower OFF stopper 215a.

By implementing the pixel unit 211 of the present embodiment and by controlling the mirror 212 to project a light intensity of about ¼ relative to the light intensity projected from the mirror is at an ON state, the controllable gray scales can be increased by four times.

In comprising to a conventional single-plate sequential system, the time duration of the LSB in the case of applying a control signal of 8 bits, there are 256 grayscales, and the length of the time duration is about 20 microseconds. The present embodiment is capable of applying a control signal of 10 bits, that is, 1024 grayscales, in the same time. Furthermore, a system employing three mirror 212 devices is capable of applying a control signal of 12 bits, that is, 4096 grayscales.

In order to increase the number of grayscales by using the oscillation state as noted above, unlike the conventional technique, the spring of the hinge 213 is preferred to be soft and flexible. The mirror 212 oscillates for longer duration than a prescribed time T. The ratio of intensity of light transmitting through the projection optical system 130 can be easily set to a desired value. Therefore, the stress applied to the spring of the hinge 213 is small. The number of grayscales can be increased without a limited by the lifetime of the hinge 213. Furthermore, a control time interval for controlling the cycle of the mirror oscillation for an extended time becomes longer. This longer control cycle is beneficial even with an increased number of pixels. A video image signal is supplied to every line of an array of the mirror 212. For practical operation, a memory zone provided for the first pixel of a single line and a data signal is also provided for the last pixel of the line simultaneously. The time required for supplying all lines with the video signals and supplying the first pixel with a video signal again must be shorter than the time of LSB. Considering the data transfer time, the longer the LSB, more time is allowed for greater amount of data transfer and the system is more able to respond to process image display of a high resolution by larger number of pixels.

Figure 17C:
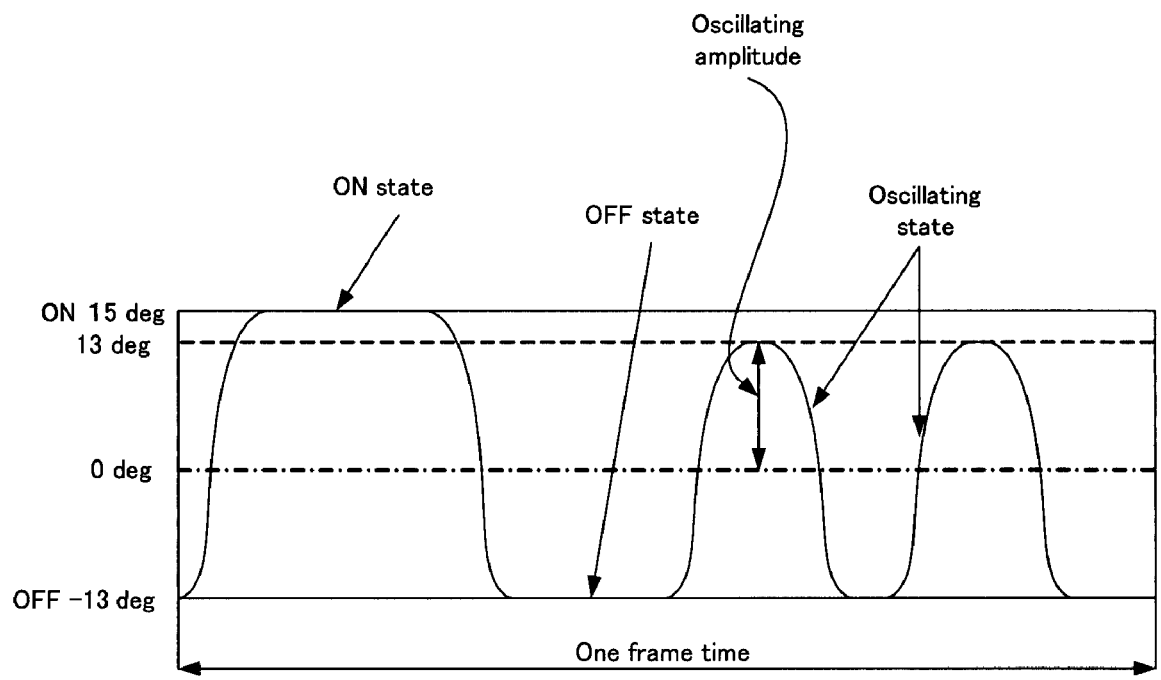
FIG. 17C exemplifies a state of a micromirror during one frame time of the deflection element shown in FIG. 17A.

FIG. 17C is a timing diagram for explaining a state of the mirror 212 during one frame time of the pixel unit 211 shown in FIG. 17A. The pixel unit 211 according to the present embodiment is configured to control the mirror 212 in the ON state with an inkling angle to +15 degrees, the OFF state with an inclining angle to −13 degrees. Furthermore, the mirror device is controllable to operate at the oscillating state of oscillating the mirror between −13 and +13 degrees as shown in FIG. 17C to generate additional levels of gray scales.

Figure 18A:
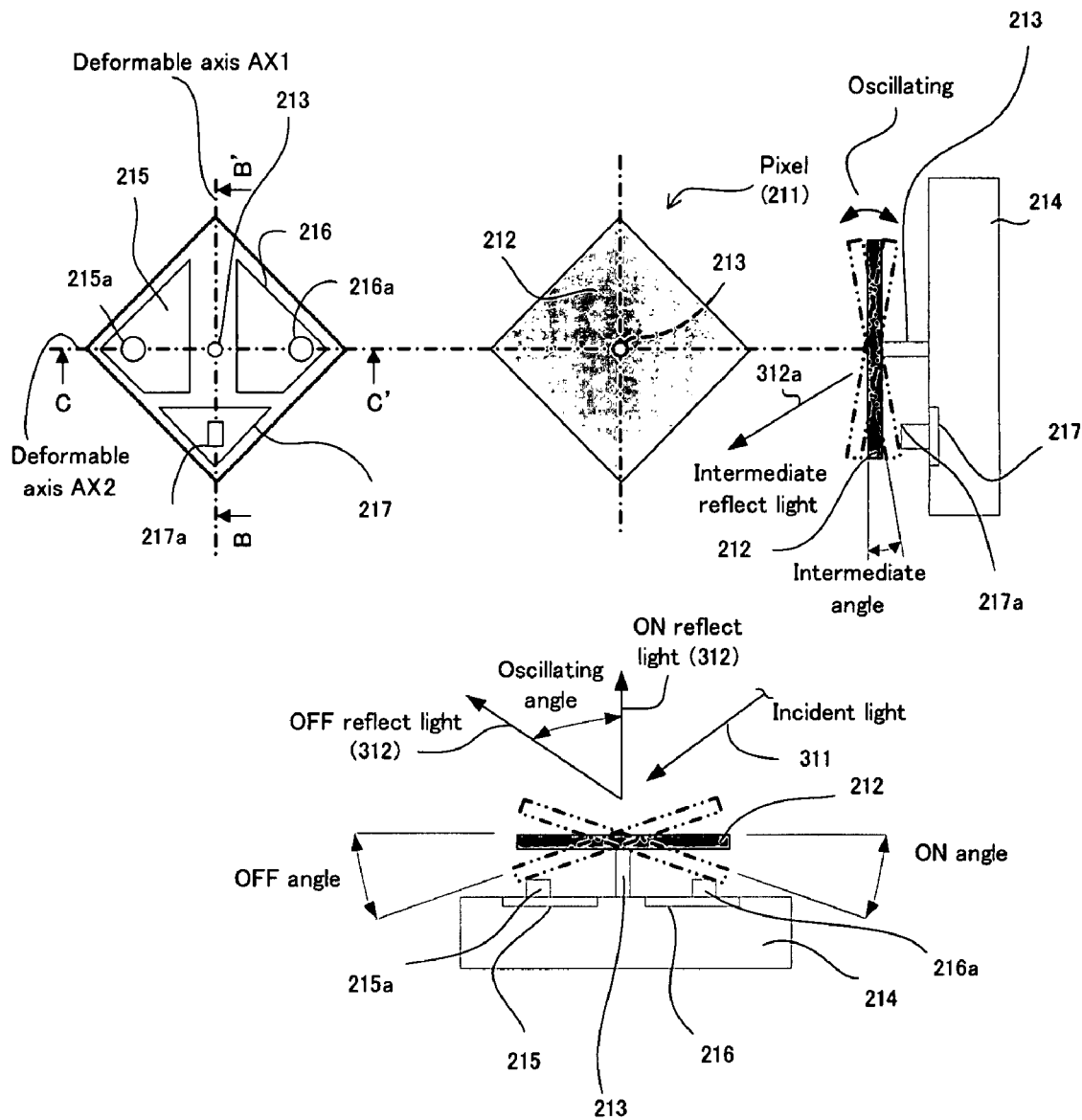
FIG. 18A exemplifies another configuration of a deflection element.

FIG. 18A presents top views and side cross sectional views for showing another exemplary configuration of the pixel unit 211. Referring to FIG. 18A, the mirror 212 of the pixel unit 211 (together with the hinge 213) is shown in the top center, the top view of the pixel unit 211 with the mirror removed is shown to the left side and a B-B' cross-section (together with the mirror 212) of the pixel unit 211 is shown to the right side. A C-C' cross-section (together with the mirror 212) of the pixel unit 211 is also shown in the bottom of FIG. 18A.

As shown in FIG. 18A, the pixel unit 211 according to the present embodiment is provided with an intermediate electrode 217 and an intermediate stopper 217a for controlling the mirror to operate at the intermediate state. to the mirror further includes the ON electrode 216, OFF electrode 215, ON stopper 216a and OFF stopper 215a. The distance from the ON stopper 216a to deformable axis AX1 and that from the OFF stopper 215a to deformable axis AX1 are the same. The heights of the ON stopper 216a and OFF stopper 215a are also the same. The intermediate stopper 217a is configured to have a greater height than that of the ON stopper 216a and OFF stopper 215a. The intermediate stopper 217a is formed with a cross-sectional feature to prevent the mirror 212 from physically contacting the stopper when the mirror 212 is inclined with the deformable axis AX1 as the deflection axis. The height of the intermediate stopper 217a is determined by the same consideration. The cross-sectional feature of the hinge 213 is approximate a circle.

By applying a predetermined voltage to the ON electrode 216 causes the mirror 212 to move to the ON position by inclining with the deformable axis AX1 as the deflection axis until the mirror 212 contacts the ON stopper 216a. The mirror reflects the incident light 311 to the projection optical system 130 (refer to the ON reflection light). Note that the incident light 311 is projected at a predetermined angle that is perpendicular to the deformable axis AX1.

Also, by applying a predetermined voltage to the OFF electrode 215 causes the mirror 212 to move the OFF angular position by inclining with the deformable axis AX1 as the deflection axis until the mirror 212 contacts the OFF stopper 215a. The mirror reflects the incident light 311 away from the projection optical system 130 (refer to the OFF reflection light).

By terminating the voltage applied to the intermediate electrode after making the mirror 212 contacts the intermediate stopper 217a by first applying a predetermined voltage to the intermediate electrode causes the mirror 212 to oscillate and operate in the oscillation state. The mirror is operated to oscillate freely with the deformable axis AX2 as the deflection axis. The mirror reflects the incident light 311 to the directions corresponding to the oscillation state of the mirror 212.

Alternatively, the mirror 212 may be controlled for a prescribed time to stay in the intermediate state in contact with the intermediate stopper 217a (refer to the intermediate reflection light).

In the present exemplary embodiment, the mirror element is configured to control the inclination angle of the mirror 212 (i.e., the ON angle) at +13 degrees in the ON state, that of the mirror 212 (i.e., the OFF angle) at −13 degrees in the OFF state and that of the mirror 212 (i.e., the intermediate angle) between +4 and −4 degrees in the oscillation state.

Figure 18B:
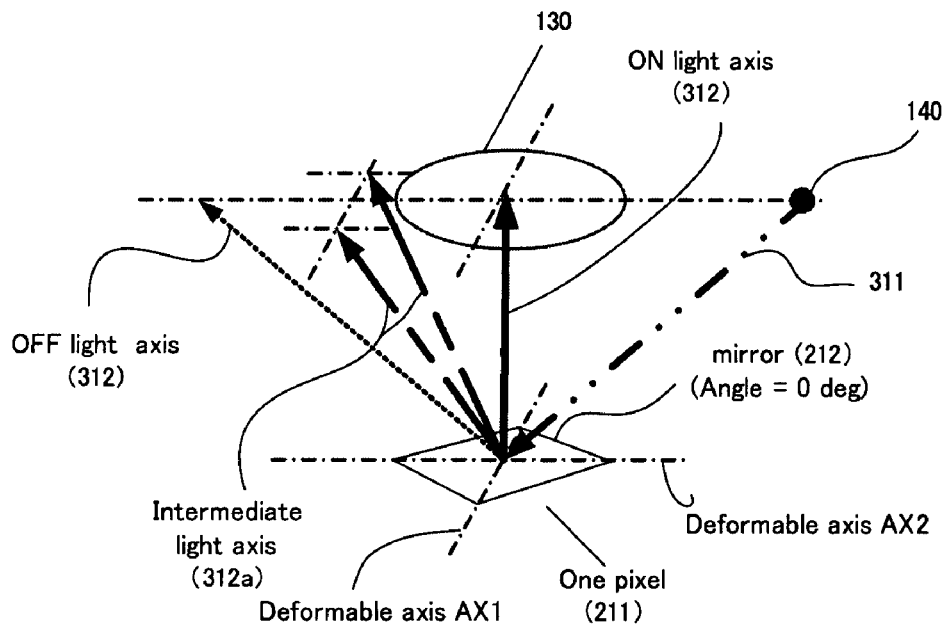
FIG. 18B shows the optical axis of a reflection light when a micromirror is in the ON state, OFF state and oscillation state.

FIG. 18B shows the optical axis of the reflection light 312 when the mirror 212 is in the ON state, OFF state and oscillation state. The mirror 212 is controlled to incline with the deformable axis AX1 functioning as the deflection axis. The mirror reflects the incident light 311 to the projection optical system 130 (refer to the ON light axis) when the mirror is in the ON state, and reflects the incident light 311 to the outside of the projection optical system 130 (refer to the OFF light axis) when the mirror 212 is in the OFF state, as shown in FIG. 18B.

Meanwhile, the mirror 212 reflects the incident light 311 to the directions corresponding to the oscillation state as the mirror 212 is control to oscillate (refer to the intermediate light axis) when it is in the oscillation state. The mirror oscillates with the deformable axis AX2 serve the function as the deflection axis.

Figure 18C:
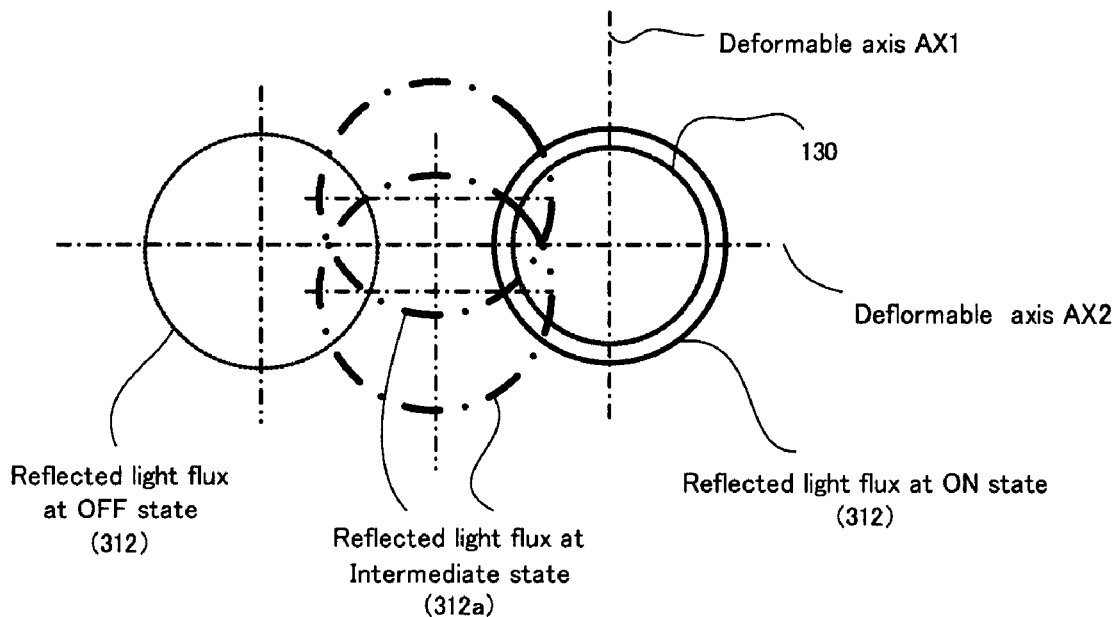
FIG. 18C shows a flux of light of a reflection light corresponding to each optical axis shown in FIG. 18B.
Figure 21A:
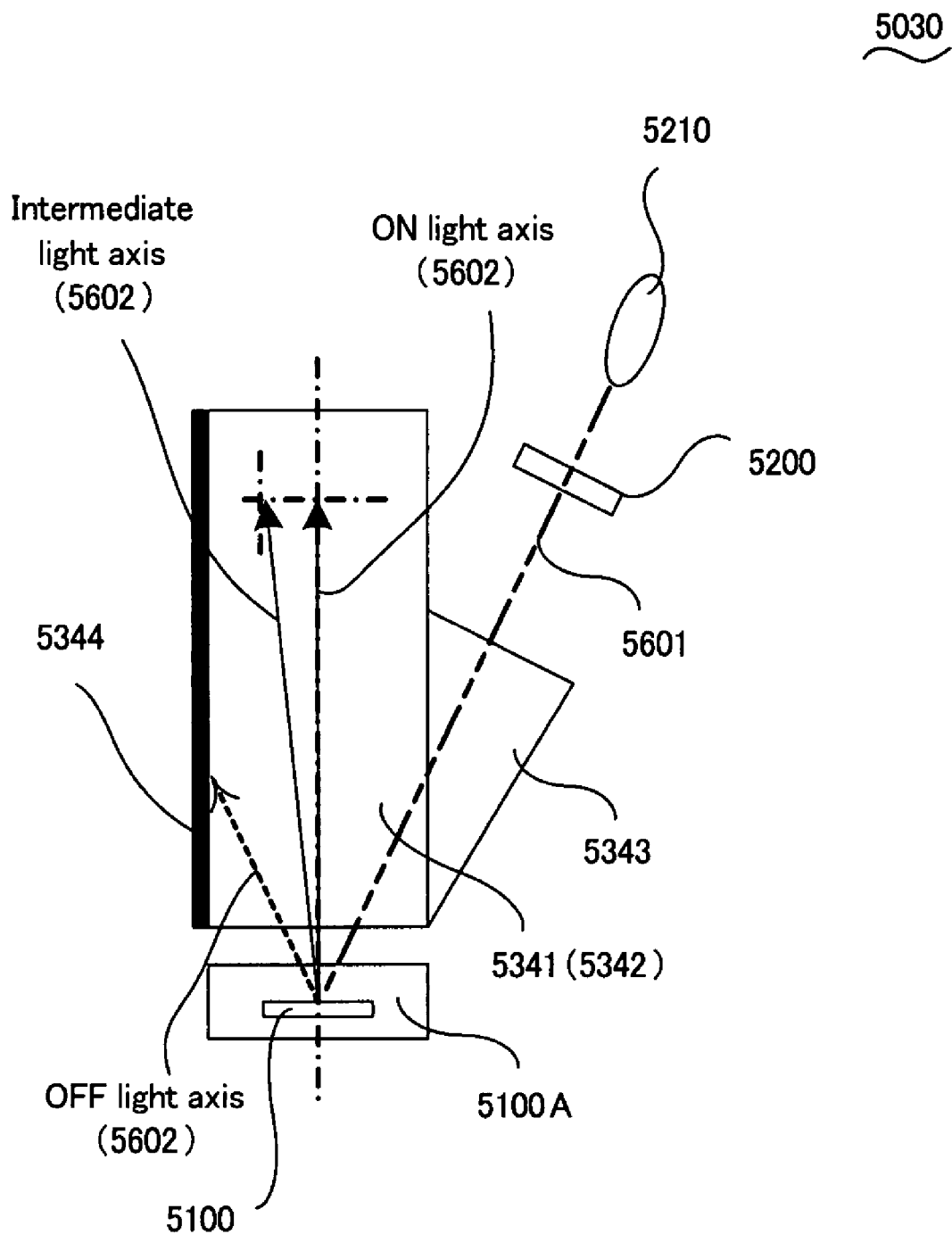
FIG. 21A shows a side view of a synthesis optical system of a projection apparatus according to a preferred embodiment of the present invention.
Figure 21B:
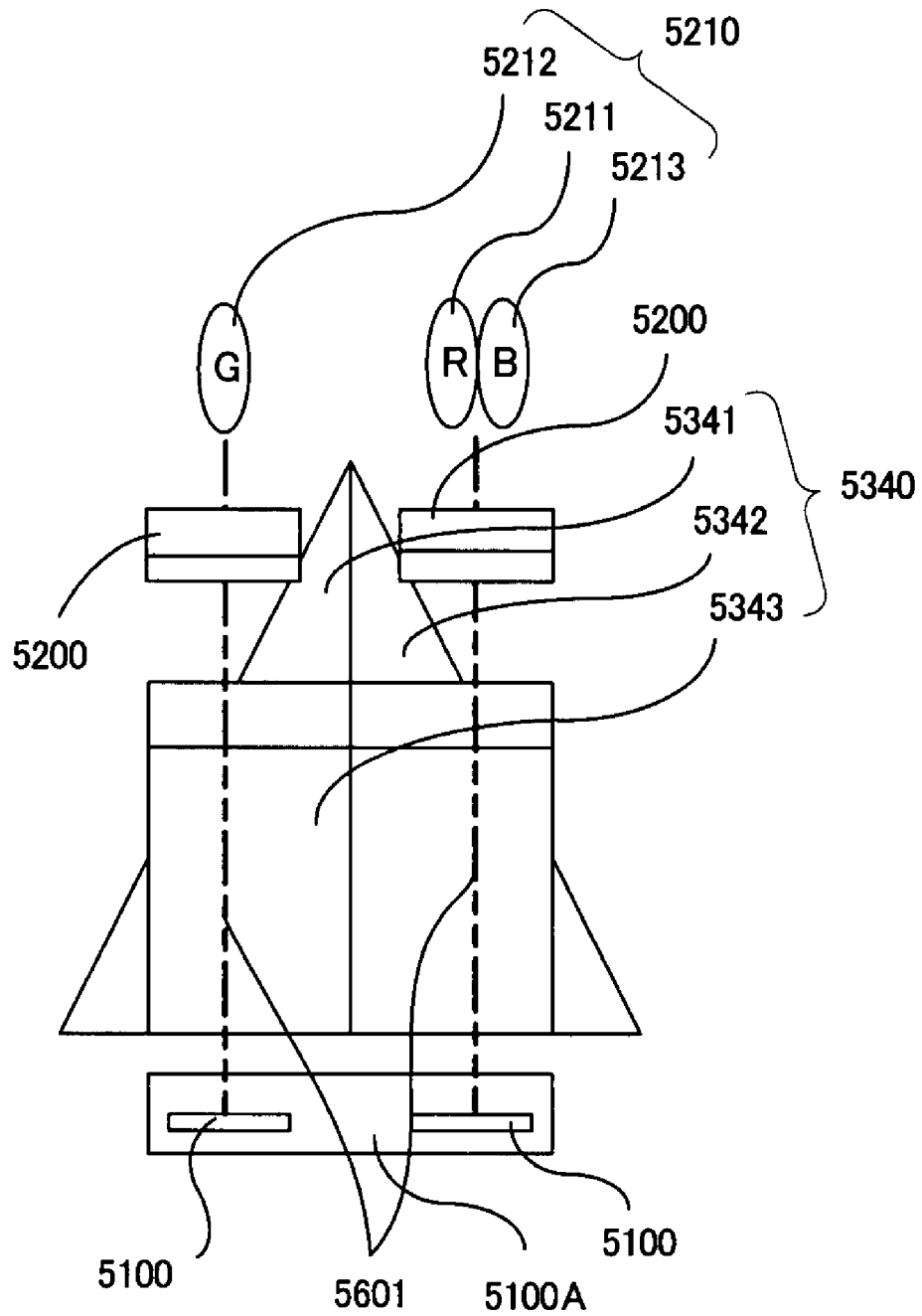
FIG. 21B shows a front view of a synthesis optical system of a projection apparatus according to a preferred embodiment of the present invention.
Figure 21C:
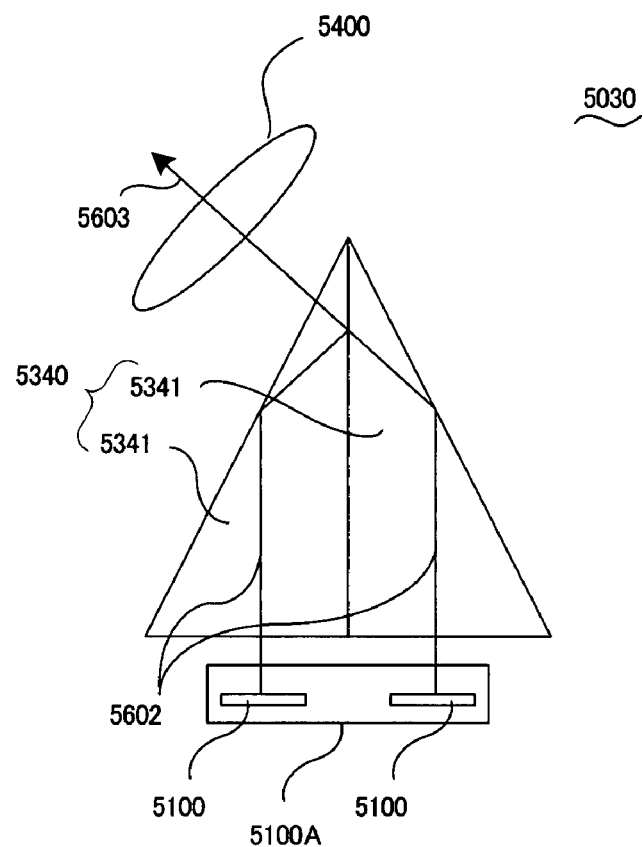
FIG. 21C shows a rear view of a synthesis optical system of a projection apparatus according to a preferred embodiment of the present invention.
Figure 21D:
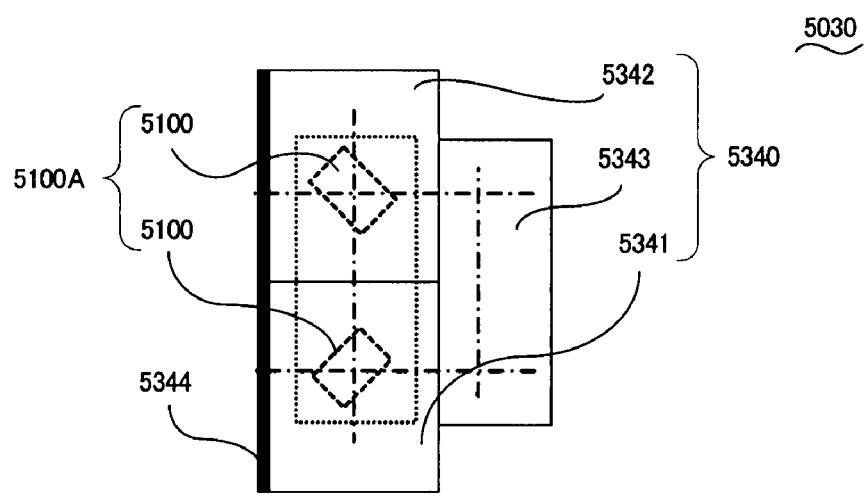
FIG. 21D shows an upper plain view of a synthesis optical system of a projection apparatus according to a preferred embodiment of the present invention.

FIG. 18C shows a flux of light of the reflection light 312 corresponding to each optical axis shown in FIG. 18B. The light flux of the reflection light 312 is reflected in the ON state to enter into the projection optical system 130 to cover the entire projection area as shown in FIG. 18C. Note that the present embodiment is configured to reflect the light with a larger diameter of the reflected light flux in the ON state than that of the projection optical system 130. On the other hand, the flux of the light reflected in the OFF state is guided away from the projection optical system 130. And only a part of the flux of the light reflected in the oscillation state or intermediate state (i.e., the intermediate reflection light 312a) is projected to an area that is overlapped to the projection optical system 130.

FIG. 19 is a functional block diagram for showing a configuration of a projection apparatus according to an alternate preferred embodiment of the present invention. A projection apparatus 5010 according to the present embodiment includes a single spatial light modulator (SLM) 5100 (corresponding to the spatial light modulation (SLM) device 200 described above), a control unit 5500, a Total Internal Reflection (TIR) prism 5300, a projection optical system 5400 and a light source optical system 5200 as shown in FIG. 19. The projection apparatus 5010 is a so-called single-plate projection apparatus 5010 comprising a single spatial light modulator 5100. The projection optical system 5400 includes the spatial light modulator 5100 and TIR prism 5300 in the optical axis of the projection optical system 5400. The display system further includes alight source optical system 5200 provided in such a manner that the optical axis thereof is in a different angle from that of the projection optical system 5400.

The TIR prism 5300 provides the function of making an illumination light 5600, which is incident from the light source optical system 5200 positioned on the side, incident to the spatial light modulator 5100 at a prescribed inclination angle as an incident light 5601 and also making a reflection light 5602, which is approximately vertically reflected on the spatial light modulator 5100, transmit to the projection optical system 5400.

The projection optical system 5400 projects the reflection light 5602, to transmit through the spatial light modulator 5100 and TIR prism 5300, to project to a screen 5900 or the like as a projection light 5603 for image display. The light source optical system 5200 comprises a variable light source 5210, a condenser lens 5220 is used for focusing the light-source flux from the variable light source 5210, a rod type condenser body 5230 and a condenser lens 5240. The variable light source 5210, condenser lens 5220, rod type condenser body 5230 and condenser lens 5240 are placed, in this order, in the optical axis of the illumination light 5600 emitted from the aforementioned variable light source 5210 and incident to the side of the TIR prism 5300.

The projection apparatus 5010 implements a color display on the screen 5900 by using a single spatial light modulator 5100 by applying a sequential color display method. The variable light source 5210, may include a red laser light source 5211, a green laser light source 5212 and a blue laser light source 5213 which allow individual controls of the emission states, performs the operation of dividing one frame of display data into a plurality of sub-fields (i.e., three sub-fields corresponding to red (R), green (G) and blue (B) in this case) and making each of the red laser light source 5211, green laser light source 5212 and blue laser light source 5213 turned on in time series at the time band corresponding to each color as described in detail later. With the configuration as shown for, the projection apparatus 5010, the control unit 5500 similarly configured to the control apparatus 300 described above controls the spatial light modulator 5100 (i.e. the spatial light modulation element 200) by applying the control method exemplified in FIG. 16 described above.

FIG. 20 is a functional block diagram for showing a configuration of a projection apparatus according to another preferred embodiment of the present invention. The projection apparatus 5020 is a so-called multiple-plate projector comprising a plurality of spatial light modulators 5100 (i.e., 5100R, 5100G and 5100B), which is the difference from the above described projection apparatus 5010. The projection apparatus 5020 comprises a plurality of spatial light modulators 5100, and a light separation/synthesis optical system 5310 is provided between the projection optical system 5400 and each of the spatial light modulators 5100. The light separation/synthesis optical system 5310 comprises a TIR prism 5311, color separation prism 5312 and color separation prism 5313. The TIR prism 5311 has the function of leading an illumination light 5600 incidents from the side of the optical axis of the projection optical system 5400 to the spatial light modulator 5100 side. The color separation prism 5312 has the functions of separating red (R) light from an incident light 5601 incident by way of the TIR prism 5311 and making the red light incident to the red light-use spatial light modulators 5100R, and of leading the reflection light 5602R of the red light to the TIR prism 5311. Similar to above described image display systems, the color separation prism 5313 has the functions of separating blue (B) and green (G) lights from the incident light 5601 transmitted through the TIR prism 5311 and projected to the blue color-use spatial light modulators 5100B and green color-use spatial light modulators 5100G, and of leading the reflection light 5602B of the blue and the reflection light 5602G of the green light to the TIR prism 5311.

Therefore, the spatial light modulations of three colors of R, G and B are simultaneously performed at three spatial light modulators 5100, respectively, and the reflection lights 5602R, 5602B and 5602G after the operation of the modulations become the projection light 5603 through the projection optical system 5400 to project on the screen 5900 to carry out color display. In this exemplary embodiment of the projection apparatus 5020, the control unit 5500 is configured similarly to the control apparatus 300 described above that controls the plurality of spatial light modulators 5100 by using the modulation control signal 440 combining the first mirror control signal 411 and second mirror control signal 421 as described above. It is understood that various modifications are conceivable for a light separation/synthesis optical system in lieu of being limited to the light separation/synthesis optical system 5310.

FIGS. 21A, 21B, 21C and 21D are configuration diagrams of the optical system of a projection apparatus using a plurality of spatial light modulators 5100. FIG. 27A is a side view of a synthesis optical system according to the present embodiment; FIG. 27B is the front view; FIG. 27C is the rear view; and FIG. 27D is the upper plain view. The optical system of a projection apparatus 5030 according to the present embodiment comprises a device package 5100A integrally incorporating a plurality of spatial light modulators 5100, a color synthesis optical system 5340, a light source optical system 5200 and a variable light source 5210. The plurality of spatial light modulators 5100 (i.e., spatial light modulation elements 200) incorporated in the device package 5100A are fixed in a manner that the rectangular contour of each of the modulators 5100 is inclined by approximately 45 degrees, in the horizontal plane, in relation to each side of the device package 5100A of similar rectangular contour.

The color synthesis optical system 5340 is placed on the device package 5100A. The color synthesis optical system 5340 comprises prisms 5341 and 5342 of a right-angle triangle pole of a result of joining together so as to make an equilateral triangle column on the longitudinal side and a light guide block 5343 of a right-angle triangle column of a result of joining slope surfaces, with the bottom surface facing up, on the side faces of the prisms 5341 and 5342. A light absorption body 5344 is provided on the prisms 5341 and 5342, on the side surface and on the reverse side of the face where the light guide block 5343 is adhesively attached.

The bottom of the light guide block 5343 is equipped with the light source optical system 5200 of the green laser light source 5212, and the light source optical system 5200 of the red laser light source 5211 and blue laser light source 5213, with each of them having a vertical optical axis. The illumination light 5600 emitted from the green laser light source 5212 is incident to the spatial light modulator 5100, on one side, which is positioned immediately under the prism 5341 as an incident light 5601 through the light guide block 5343 and prism 5341. Also, the illumination lights 5600 respectively emitted from the red laser light source 5211 and blue laser light source 5213 are incident to the spatial light modulator 5100, on the other side, which is positioned immediately under the prism 5342 as the incident light 5601 by way of the light guide block 5343 and prism 5342.

The red and blue incident lights 5601 projected onto the spatial light modulator 5100 is reflected along a vertically upward direction as a reflection light 5602 transmitted into the prism 5342 to further reflect from the external surface that is adhesively attached. According to this order of light transmission through the prism 5342, followed by transmitting the light to the projection optical system 5400 for displaying an image by applying the projection light 5603. Meanwhile, the green incident light 5601 is projected to the spatial light modulator 5100 and reflected vertically upward to project as a reflection light 5602 through the prism 5341 and further reflected from the external surface of the prism 5341, along the same light path as the red and blue reflection lights 5602 and incident to the projection optical system 5400. The light projected through the projection optical system 5400 is processed to become the projection light 5603 when the state of the mirror 212 is operated in the ON state.

As described above, the mirror device according to the present embodiment is configured to include at least two spatial light modulators 5100 in a single device package 5100A. One module is illuminated only with the incident light 5601 from the green laser light source 5212. The other one module of the spatial light modulator 5100 is illuminated with the incident light from at least either of the red laser light source 5211 or blue laser light source 5213. Individual modulation lights respectively modulated by two these two spatial light modulators 5100 are projected to the color synthesis optical system 5340 as described above. The light projected from the color synthesis optical system is further magnified by the projection optical system 5400 and projected onto the screen 5900 or the like as the projection light 5603 for image display. Also the projection apparatus 5030 according to the present embodiment comprises a control apparatus 300 which controls the spatial light modulator 5100 by using the modulation control signal 440 including the first mirror control signal 411 and second mirror control signal 421 according to various embodiments and combinations of various control methods as described above.

Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. An image display system comprising:
   a signal processor for receiving an image signal of an N-bit binary data word, where N is a positive integer wherein:
   said signal processor further comprising a data converter for converting at least a M-bit data of the N-bit binary data word into non-binary data having multiple bits, where M is a positive integer and N≧M≧2; and
   all bits of the non-binary data have a weighting factor equal to, or less than, a weighting factor of a least significant bit of the M-bit data of the N-bit binary data word for modulating a spatial light modulating device for projecting a display image.

2. The image display system of claim 1, wherein:
   said data converter further converting the M-bit data comprising M consecutive bits of said N-bit binary data word into said non-binary data.

3. The image display system of claim 1, wherein:
   the data converter outputting all non-zero bits in the non-binary data first before outputting zero bits in said non-binary data.

4. The image display system of claim 1, wherein:
   the data converter outputting all zero bits in the non-binary data first before outputting non-zero bits in said non-binary data.

5. The image display system of claim 1, wherein:
   the data converter dividing the N-bit binary data word into at least two pieces of binary data and converting said two pieces of binary data into non-binary data.

6. The image display system of claim 5, wherein:
   the data converter outputting said at least two pieces of non-binary data starting from a bit in said two pieces of non-binary data having a data bit value different from a data bit value of an adjacent bit.

7. The image display system of claim 1, wherein
   the data converter dividing the N-bit binary data word into at least two pieces of binary data and then further dividing at least one piece of said at least two pieces of binary data into at least two sub-pieces of the same binary data, and
   a least significant bit of the same binary data is applied a weighting factor less than a weighting factor of a least significant bit of the N-bit binary data, and
   at least one of said sub-pieces of the same binary data is converted into a non-binary data.

8. The image display system of claim 7, wherein:
   the data converter outputting all non-zero bits in said non-binary data converted from said sub-piece of the same binary data first before outputting zero bits in said non-binary data converted from said sub-piece of the same binary data.

9. The image display system of claim 7, wherein:
   the data converter outputting all zero bits in said non-binary data converted from said sub-piece of the same binary data first before outputting non-zero bits in said non-binary data converted from said sub-piece of the same binary data.

10. The image display system of claim 7, wherein:
    the data converter starts outputting the non-binary data from a bit having a data bit value different from a data bit value of adjacent bit in said non-binary data converted from said sub-piece of the same binary data.

11. A display device, comprising:
    a signal processor for receiving an image signal of N-bit binary data word, where N is a positive integer wherein said signal processor further comprising a data converter for converting at least a M-bit data of the N-bit binary data word into non-binary data having multiple bits, where M is a positive integer and N≧M≧2; and
    at least one deflection mirror device having a plurality of mirror elements, wherein:
    all bits of the non-binary data have a weighting factor equal to, or less than, a weighting factor of a least significant bit of the M-bit data of the N-bit binary data word for modulating said deflection mirror for projecting a display image, wherein
    (a) each mirror element is controlled to deflect to at least two deflection states,
    (b) the deflection states comprising a deflection state of having a fixed mirror deflection angle and/or a deflection state of varying mirror deflection angle,
    (c) each mirror element is controlled by the non-binary data, and
    (d) each deflection state is continuously maintained for a duration corresponding to a value of each bit of the non-binary data.

12. The display device of claim 11, wherein:
    the data converter starts outputting in sequence each bit of the non-binary data from two adjacent bits having an equal data value.

13. The display device of claim 11, wherein:
    each of said mirror elements having at least two deflection states, comprising a first deflection state of having a fixed mirror deflection angle and/or a second deflection state of varying mirror deflection angle,
    each mirror element is controlled by the non-binary data, and each deflection state is continuously maintained in a deflection state for a duration corresponding to a value of each bit of the non-binary data.

14. The display device of claim 13, wherein
    the deflection state of the fixed mirror deflection angle comprising a state of the mirror deflecting in an ON mirror deflection angle or a state of deflecting in an OFF mirror deflection angle or "a state of the mirror deflecting between the ON state and OFF state".

15. The display device of claim 13, wherein:
    the deflection state of the varying mirror deflection angle comprising a deflecting state of varying or oscillating of said mirror between the ON state and OFF state.

16. The display device of claim 11, wherein:
    said data converter further converting the M-bit data comprising M consecutive bits of said N-bit binary data word into said non-binary data.

17. The display device of claim 11, wherein:
the data converter outputting all non-zero bits in said non-binary data first before outputting zero bits in said non-binary data.

18. The image signal processor of claim 11, wherein:
the data converter outputting all zero bits in said non-binary data first before outputting non-zero bits in said non-binary data.

19. The image signal processor of claim 11, wherein:
the data converter starts outputting said non-binary data from a bit having a data bit value different from a data bit value of an adjacent bit.

20. A control method used for a display apparatus, comprising:
receiving an image signal of an N-bit binary word, where N is a positive integer;
converting at least M-bits of the of N-bit binary data word into a plurality of pieces of non-binary data each having a weighting factor equal to, or less than, a weighting factor of a least significant bit of the binary data, where M is a positive integer and $N \geq M \geq 2$;
outputting bits in sequence starting from a bit of a bit value same as an adjacent bit; and
controlling a spatial light modulation element by using the non-binary data.

21. The control method used for a display apparatus of claim 20, wherein:
said step of converting said M-bits further includes a step of converting M consecutive bits of said N bits binary data word.

22. The control method used for a display apparatus of claim 20, wherein:
said step of outputting said non-binary data further comprising a step of outputting the non-binary data in sequence starting from a bit of "1".

23. The control method used for a display apparatus of claim 20, wherein:
said step of outputting said non-binary data further comprising a step of outputting the non-binary data in sequence starting from a bit of "0".

24. The control method used for a display apparatus of claim 20, further comprising a step of:
dividing the binary data into at least two pieces of consecutive binary data, followed by converting the two pieces of binary data into non-binary data.

25. The control method used for a display apparatus of claim 24, wherein:
said step of outputting said non-binary data further comprising a step of starting from a bit having a data bit value different from a data bit value of an adjacent bit.

\* \* \* \* \*